US010492626B2

(12) United States Patent
Auda et al.

(10) Patent No.: US 10,492,626 B2
(45) Date of Patent: Dec. 3, 2019

(54) FOOD SERVICE MATERIAL DISPENSERS, SYSTEMS, AND METHODS

(71) Applicant: GPCP IP Holdings LLC, Atlanta, GA (US)

(72) Inventors: Michelle Lynn Auda, Atlanta, GA (US); Daniel Huffaker, Kennesaw, GA (US); Brandon Seth Cross, Atlanta, GA (US); Daniel James Geddes, Appleton, WI (US); Lenox Gregory Wilson, Alpharetta, GA (US); Brian Scott Borke, Appleton, WI (US); Jason Aaron Morgan, Appleton, WI (US); James Niemeier, De Pere, WI (US); Gary Knauf, Bear Creek, WI (US); John Peter Nenadic, Camas, WA (US); Daniel Bruce Meyer, Lake Oswego, OR (US); Jeffery Burle Kennedy, Vancouver, WA (US)

(73) Assignee: GPCP IP Holdings LLC, Atlanta, GA (US)

( * ) Notice: Subject to any disclaimer, the term of this patent is extended or adjusted under 35 U.S.C. 154(b) by 0 days.

(21) Appl. No.: 16/212,077

(22) Filed: Dec. 6, 2018

(65) Prior Publication Data

US 2019/0182390 A1 Jun. 13, 2019

Related U.S. Application Data

(60) Provisional application No. 62/712,465, filed on Jul. 31, 2018, provisional application No. 62/597,516, filed on Dec. 12, 2017.

(51) Int. Cl.

*A47F 1/08* (2006.01)
*B41J 3/407* (2006.01)

(Continued)

(52) U.S. Cl.

CPC ............... *A47F 1/085* (2013.01); *B41J 3/407* (2013.01); *B41J 3/4073* (2013.01); *B41J 3/54* (2013.01);

(Continued)

(58) Field of Classification Search

CPC .................................. A47F 1/085; B41J 3/407
See application file for complete search history.

(56) References Cited

U.S. PATENT DOCUMENTS 3,726,453 A * 4/1973 Shaffer ................ C03B 33/037 225/2
4,354,408 A * 10/1982 Carte ...................... B26D 5/26 271/188

(Continued)

FOREIGN PATENT DOCUMENTS

CN 1924787 A 3/2007
CN 102915601 A 2/2013

(Continued)

OTHER PUBLICATIONS

Quick Serve Restaurants (QSR); *Star Micronics*; retrieved Apr. 18, 2019 from https://www.starmicronics.com/pages/QuickServiceRestaurantsQSR.

(Continued)

*Primary Examiner* — Ibrahim Siddo

(57) ABSTRACT

Systems for providing on-demand food service material printing for food service are provided herein. A food service material dispenser comprises a roll holder configured to hold a roll of food service material, one or more rollers, and a motor configured to operate to translate the food service material along a path within the dispenser. The dispenser includes a cutting arrangement configured to perform a cut of the food service material to form the sheet of food service material that defines a size associated with a food service order. The dispenser also includes a printer configured to (Continued)

print at least one of order information or personalization information on the food service material that is based on the associated food service order. The dispenser further includes a chute configured to dispense the sheet of food service material, which includes the at least one of order information or personalization information printed thereon.

20 Claims, 37 Drawing Sheets

(51) Int. Cl.

| | |
|---|---|
| ***G06Q 20/20*** | (2012.01) |
| ***G06Q 50/12*** | (2012.01) |
| ***B41J 11/70*** | (2006.01) |
| ***B41J 15/04*** | (2006.01) |
| ***B41J 15/16*** | (2006.01) |
| ***H04N 1/00*** | (2006.01) |
| ***B41J 3/54*** | (2006.01) |
| ***B41J 11/48*** | (2006.01) |
| ***B41J 11/66*** | (2006.01) |
| *B41M 3/00* | (2006.01) |
| *G06Q 50/00* | (2012.01) |

(52) U.S. Cl.

CPC .............. *B41J 11/485* (2013.01); *B41J 11/66* (2013.01); *B41J 11/663* (2013.01); *B41J 11/70* (2013.01); *B41J 15/042* (2013.01); *B41J 15/16* (2013.01); *G06Q 20/209* (2013.01); *G06Q 50/12* (2013.01); *H04N 1/00145* (2013.01); *H04N 1/00188* (2013.01); *H04N 1/00206* (2013.01); *H04N 1/00673* (2013.01); *H04N 1/00676* (2013.01); *B41J 15/04* (2013.01); *B41M 3/00* (2013.01); *G06Q 50/01* (2013.01)

(56) References Cited

U.S. PATENT DOCUMENTS 5,042,351 A * 8/1991 Rosenthal .............. B21D 43/09 83/24
RE36,876 E 9/2000 Daniels et al.
6,577,407 B1 6/2003 Kopecki
6,646,659 B1 11/2003 Brown et al.
6,793,755 B2 9/2004 Schaupp et al.
6,859,215 B1 2/2005 Brown et al.
6,961,710 B1 11/2005 Yanagisawa et al.
7,070,250 B2 7/2006 Lester et al.
7,110,964 B2 9/2006 Tengler et al.
7,123,375 B2 10/2006 Nobutani et al.
7,344,070 B2 3/2008 Nobutani
7,404,349 B1 7/2008 Fiske et al.
7,424,443 B2 9/2008 Yanagisawa et al.
7,460,252 B2 12/2008 Campbell et al.
7,580,146 B2 8/2009 Halsema
7,648,067 B2 1/2010 Nobutani
7,689,461 B2 3/2010 Minowa
7,762,181 B2 7/2010 Boland et al.
7,819,489 B2 10/2010 Gambino et al.
7,908,778 B1 3/2011 Dushane
8,033,452 B2 10/2011 Koakutsu
8,098,408 B2 1/2012 Sawada et al.
8,164,785 B2 4/2012 Ferlitsch
8,215,544 B2 7/2012 Koakutsu
8,249,946 B2 8/2012 Froeseth et al.
8,264,725 B1 9/2012 Pillutla et al.
8,445,104 B2 5/2013 Vigunas et al.
8,459,542 B2 6/2013 Koakutsu
8,537,399 B2 9/2013 Ganesan et al.
8,861,016 B2 10/2014 Kodama et al.
8,873,096 B2 10/2014 Nishimura
8,887,992 B2 11/2014 Koakutsu
8,888,492 B2 11/2014 Riscalla
8,913,284 B2 12/2014 Nishimura
9,030,685 B2 5/2015 Shima et al.
9,129,206 B2 9/2015 Furuhata et al.
9,156,279 B2 10/2015 Shima et al.
9,159,094 B2 10/2015 Hurst et al.
9,224,275 B2 12/2015 Nishimura
9,226,513 B2 1/2016 Ream et al.
9,280,305 B2 3/2016 Takasu et al.
9,406,084 B2 8/2016 Havas
9,591,078 B2 3/2017 Nishimura
9,676,207 B2 * 6/2017 Balar ......................... B41J 3/36
9,824,382 B2 11/2017 Holman et al.
9,830,764 B1 11/2017 Murphy
10,032,201 B2 7/2018 Hurst et al.
10,035,643 B2 7/2018 Holman et al.
10,053,280 B2 8/2018 Holman et al.
10,089,669 B2 10/2018 Hurst et al.
10,115,142 B2 10/2018 Holman et al.
10,176,505 B2 1/2019 Holman et al.
10,269,052 B2 4/2019 Shinkle, II et al.
2002/0004749 A1 1/2002 Froseth et al.
2003/0014305 A1 1/2003 Harden
2003/0033915 A1 2/2003 Glemser et al.
2003/0065565 A1 4/2003 Wagner et al.
2003/0074254 A1 4/2003 Iijima
2003/0080005 A1 * 5/2003 Toussant .............. B65D 85/672 206/225
2003/0110083 A1 6/2003 Taylor
2004/0093250 A1 5/2004 Hasegawa
2004/0105126 A1 6/2004 Minowa et al.
2004/0158499 A1 8/2004 Dev et al.
2004/0238555 A1 12/2004 Parks
2004/0267544 A1 12/2004 Michelson et al.
2005/0006449 A1 1/2005 D'Amato
2005/0015256 A1 1/2005 Kargman
2005/0021407 A1 1/2005 Kargman
2005/0075934 A1 4/2005 Knight et al.
2005/0102179 A1 5/2005 Caplinger et al.
2005/0237556 A1 10/2005 Watkins
2005/0242178 A1 11/2005 Minowa
2005/0275894 A1 12/2005 Minowa
2006/0010137 A1 1/2006 Johnson
2006/0089881 A1 4/2006 Landry
2006/0155600 A1 7/2006 Mays
2006/0162284 A1 * 7/2006 Nakagawa ........... B65H 19/105 53/168
2006/0244989 A1 11/2006 Evans
2007/0150371 A1 7/2007 Gangji
2007/0221728 A1 9/2007 Ferro et al.
2008/0048012 A1 2/2008 Liou
2008/0052158 A1 2/2008 Ferro et al.
2008/0052173 A1 * 2/2008 Liou ...................... G06Q 10/08 705/15
2008/0140500 A1 6/2008 Kurkure
2008/0278750 A1 11/2008 Lehotsky et al.
2009/0066996 A1 3/2009 Minowa
2009/0287568 A1 11/2009 Cesmedziev
2010/0161521 A1 6/2010 Friend
2010/0250234 A1 9/2010 Azimi et al.
2010/0325000 A1 12/2010 Teraoka
2011/0006074 A1 * 1/2011 Machers ................. G07F 11/20 221/150 R
2012/0012604 A1 1/2012 Pfister et al.
2012/0207887 A1 * 8/2012 Battersby ................ B32B 27/08 426/127
2012/0239683 A1 9/2012 Starkman
2012/0306987 A1 12/2012 Kim
2013/0054016 A1 2/2013 Canter et al.
2013/0054695 A1 2/2013 Holman et al.
2013/0146652 A1 6/2013 Koakutsu
2013/0215055 A1 8/2013 Okuma et al.
2014/0012706 A1 1/2014 Foerster
2014/0022576 A1 1/2014 Shima et al.
2014/0041748 A1 2/2014 Angus et al.
2014/0080102 A1 3/2014 Krishna
2014/0149937 A1 5/2014 Holliday et al.
2014/0156361 A1 6/2014 Hughes

(56) References Cited

U.S. PATENT DOCUMENTS

| | | | |
|---|---|---|---|
| 2014/0214561 A1 | 7/2014 | Butler | |
| 2014/0244526 A1 | 8/2014 | Georges et al. | |
| 2014/0261858 A1 | 9/2014 | Mattos, Jr. et al. | |
| 2014/0312104 A1* | 10/2014 | Kim | B65B 11/004 229/87.05 |
| 2015/0181923 A1 | 7/2015 | Holman et al. | |
| 2015/0183534 A1 | 7/2015 | Holman et al. | |
| 2015/0185974 A1 | 7/2015 | Holman et al. | |
| 2015/0186966 A1 | 7/2015 | Holman et al. | |
| 2015/0186969 A1 | 7/2015 | Holman et al. | |
| 2015/0186970 A1 | 7/2015 | Holman et al. | |
| 2015/0186971 A1 | 7/2015 | Holman et al. | |
| 2015/0186981 A1 | 7/2015 | Holman et al. | |
| 2015/0187026 A1 | 7/2015 | Holman et al. | |
| 2016/0267567 A1 | 9/2016 | Shinkle, II et al. | |
| 2016/0267816 A1 | 9/2016 | Anderson et al. | |
| 2016/0361886 A1* | 12/2016 | Suzuki | B31F 1/2822 |
| 2017/0190474 A1 | 7/2017 | Miller | |
| 2017/0365017 A1 | 12/2017 | Ells | |
| 2018/0197163 A1 | 7/2018 | Kelly et al. | |
| 2018/0300785 A1 | 10/2018 | Hurst et al. | |
| 2019/0174933 A1 | 6/2019 | Auda et al. | |
| 2019/0180392 A1 | 6/2019 | Auda et al. | |

FOREIGN PATENT DOCUMENTS

| | | | |
|---|---|---|---|
| CN | 103679362 | A | 3/2014 |
| CN | 105046339 | A | 11/2015 |
| CN | 108021995 | A | 5/2018 |
| JP | S58-54474 | A | 3/1983 |
| JP | H06-103285 | A | 4/1994 |
| JP | 2001-306666 | A | 11/2001 |
| JP | 2002-190068 | A | 7/2002 |
| JP | 2003-16529 | A | 1/2003 |
| JP | 2006-346869 | A | 12/2006 |
| JP | 2015-111390 | | 6/2015 |
| JP | 5860841 | B2 | 2/2016 |
| JP | 5867563 | B2 | 2/2016 |
| JP | 5867564 | B2 | 2/2016 |
| JP | 5867565 | B2 | 2/2016 |
| JP | 6273815 | B2 | 2/2018 |
| JP | 6390250 | B2 | 9/2018 |
| KR | 2019990011615 | U | 3/1999 |
| KR | 2002-0074952 | A | 10/2002 |
| WO | WO 2018/182114 | A1 | 10/2018 |

OTHER PUBLICATIONS

Introducing Nforme Website visited Mar. 4, 2019 https://vimeo.com/305768354/a0a3a40a32?utm_campaign=nForme&utm_source=hs_email&utm_medium=email&utm_content=2&_hsenc=p2ANqtz-_WjXQoyWJwbD7UoIG3aTzDRWPMz_u5qthtjbyF7Q1vSirS2RppnS2JDzW41sLcvcMO7Dyz9FexkR_jZVYproCT5aoP4w&_hsmi=2.

McDonalds New Equipment Evaluation—All Day Breakfast; Website visited Mar. 4, 2019 https://www.youtube.com/watch?v—CYKgiH9jeCY&feature=youtu.be.

19Crimes; Living Wine Labels Website visited Mar. 4, 2019 https://www.9crimes.com.

"Arby's medias on Instragram;"*Picgra*. Website visited Mar. 8, 2019 https://picgra.com/location/arby-s/5760301.

"Fast Food Review: Roast Ham and Swiss Market Fresh Sandwich from Arby's;" posted Jun. 22, 2009. Website visited Mar. 8, 2019 https://www.grubgrade.com/reviews/fast-food-review-roast-ham-and-swiss-market-fresh-sandwich-from-arbys/.

Arby's Wrapper obtained at least as early as Dec. 4, 2017; 3 pp.

May 7, 2019 Search Report issued in International Patent Application No. PCT/US18/64977.

May 7, 2019 Written Opinion issued in International Patent Application No. PCT/US18/64977.

* cited by examiner

FOOD SERVICE MATERIAL DISPENSERS, SYSTEMS, AND METHODS

CROSS REFERENCE TO RELATED APPLICATIONS

This application claims priority to U.S. Provisional Application No. 62/712,465, filed Jul. 31, 2018, entitled "Personalized Food Service Material Printing Systems", and U.S. Provisional Application No. 62/597,516, filed Dec. 12, 2017, entitled "Personalized Food Service Material Printing Systems"; each of which is incorporated by reference herein in its entirety.

FIELD OF THE INVENTION

Example embodiments of the present invention generally relate to printing and dispensing systems for food service and, more particularly to on-demand food service material printing and dispensing systems for food service.

BACKGROUND

Customer experience for food service can often feel impersonal. A customer may provide a food order and a food service person may then package up the food order for the customer. The packaging is pre-printed and supplied to the food service store often months in advance, such that the customer is presented with generic food packaging for their food order. Further, any promotions or messages that a food service business may want to present to the customer on a food service material item (e.g., food wrap, food container, cup, carry-out bag, tray liner, napkin, etc.) requires a significant lag time from formation of the promotion/message to presentation to the customer.

BRIEF SUMMARY

Some embodiments of the present invention provide on-demand food service material printing for food service. Such systems may provide many advantages, including for example personalization of food service material and/or real-time promotion availability for stores. Once a customer places a request for food service, the system can determine order information about the customer's order and/or personalization information about the customer or store. Such information may be gathered based on any information available including, for example, user profiles, past order history, store promotions, social media, a user's device, among many other things. Using that information, the system may determine information to print on one or more food service material items that may be provided to the customer with their food order. Such print information may include order information (e.g., confirming their food order) and personalization information (e.g., the customer name, a promotion geared to the customer, an image that is personalized for the customer such as a favorite sports team, etc.). That print information is then printed on one or more food service material items using a dispenser (e.g., printer) in the store. In some embodiments, the food service material item may have some pre-printed information as well (e.g., logos, images, etc.). The printed food service material item may then be retrieved and used by the food service person to prepare the food order for the customer.

With personalized information printed on the food service material item, the customer's experience may improve by providing personalization and targeted promotions that are more likely to be pertinent to the customer. With order information printed on the food service material item, a food service person handling the food service material item is more likely to prepare an accurate food order for the customer. Further, providing on-demand printed food service material provides for real-time needs of the food service business and reduces significant shipping/manufacturing costs and overall waste from unused or old promotions.

Such a system may be used to provide on-demand printing for any type of food service material item including, for example, food wrap, food containers, cups, carry-out bags, tray liners, napkins, pouches, among many others. As an example, two dispensers may be available to print on rolls of food wrap (one for printing on premium food wrap and one for printing on value food wrap). Depending on the order information, the appropriate dispenser could be chosen. Further, by using rolls of food wrap, a proper dimension (e.g., length) of the food wrap could be cut using and then dispensed to the food service person for use in preparation of the food order. This provides increased variability in providing a printed food wrap sheet appropriately sized for the food order, which may reduce unnecessary waste due to oversized food wrap. Various embodiments, such as described herein, however, contemplate many different types of dispensers for printing on and dispensing different types of food service material (e.g., a food service material dispenser, a cup dispenser, a food bag dispenser, a food pouch dispenser, etc.).

In some embodiments, the available promotions or messages may be updated on-the-fly and dynamically chosen based on the customer or store. The choice of promotion or message could be based on data gathered by the system, taking into account many factors including, for example, customer trends, desired time windows or products to "push"/promote, among many other things.

In some embodiments, an example system may provide instructions to other systems (e.g., front or back-of-house dispensers/components) to help with the order or overall store management. For example, a napkin dispenser may be instructed to dispense an appropriate number of napkins to complete the food order. The system could also monitor ink usage and/or food service material usage and handle ordering/maintenance needs automatically.

In an example embodiment, a food service material dispenser for dispensing a sheet of food service material is provided. The food service material dispenser comprises a roll holder configured to hold a roll of food service material and one or more rollers. The food service material dispenser further includes a motor configured to operate at least one of the one or more rollers or the roll holder to translate a leading edge of the roll of food service material along a path within the dispenser. The food service material dispenser further includes a cutting arrangement positioned along the path downstream of the roll holder and configured to perform a cut of the food service material to form the sheet of food service material. The sheet of food service material defines a size associated with a food service order. The food service material dispenser further includes a printer positioned along the path downstream of the roll holder and configured to print at least one of order information or personalization information on the food service material. The at least one of order information or personalization information is based on the food service order associated with the dispensed sheet of food service material. The food service material dispenser further includes a chute positioned along the path downstream of both the printer and the cutting arrangement and configured to dispense the sheet of food service material. The dispensed sheet of food service material includes the at least one of order information or personalization information printed thereon.

In some embodiments, the dispenser comprises a housing that holds the roll holder, the cutting arrangement, and the printer.

In some embodiments, the printer is positioned along the path downstream of the cutting arrangement. In some embodiments, the printer includes one or more tensioning rollers that are configured to maintain tension in the cut sheet of food service material while printing occurs.

In some embodiments, the chute defines a dispensing surface that extends downwardly such that gravity causes the sheet of food service material to dispense.

In some embodiments, the roll of food service material defines food wrap.

In some embodiments, the roll of food service material comprises pre-folded food service material.

In some embodiments, the dispenser further comprises an unfolding station positioned along the path and configured to unfold at least a portion of the food service material.

In some embodiments, the dispenser further comprises an adhesive application unit positioned along the path and configured to apply adhesive to at least a portion of the food service material.

In some embodiments, the dispenser further comprises a folding mechanism positioned along the path and configured to fold the sheet of food service material to form a food service material item.

In some embodiments, the cutting arrangement comprises a first cutting roller positioned on first side of the path and a second cutting roller positioned on a second side of the path. The first cutting roller comprises a cutter configured to cut the food service material. The second cutting roller comprises a slot. The second cutting roller is aligned with the first cutting roller relative to the path such that the cutter of the first roller fits within the slot of the second cutting roller during cutting of the food service material. In some embodiments, the dispenser further comprises a controller configured to control operation of the cutting arrangement to cause the cutter of the first cutting roller to cut the food service material in order to form the sheet of food service material.

In some embodiments, the dispenser further comprises an auto-tensioner configured to maintain a desired tension level of the food service material as it travels along the path. In some embodiments, the auto-tensioner comprises a rack and pinion.

In some embodiments, the dispenser further comprises a clutch mechanism configured to provide a drag force during movement of the food service material along the path and a stationary guide bar positioned along the path and configured to provide a reverse curl to the food service material as the food service material passes over the stationary guide bar.

In some embodiments, the dispenser further comprises a controller configured to initiate operation of the motor to enable automatic loading of a leading edge of a new roll of food service material at least partially along the path once the new roll of food service material is loaded into the roll holder.

In some embodiments, the dispenser further comprises a communication element configured to communicate with a remote computing device. The remote computing device comprises a food request module configured to receive a request for food service for a customer, wherein the request for food service includes the food service order. In some embodiments, the dispenser further comprises a controller configured to receive, via the communication element and from the remote computing device, food service order data corresponding to the food service order. The controller is further configured to determine, based on the food service order data, the at least one of order information or personalization information to print on the food service material item. The controller is further configured to cause dispensing of the sheet of food service material with the at least one of order information or personalization information printed thereon.

Some additional embodiments include apparatuses, systems, and methods including various example embodiments, such as described herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 8A:
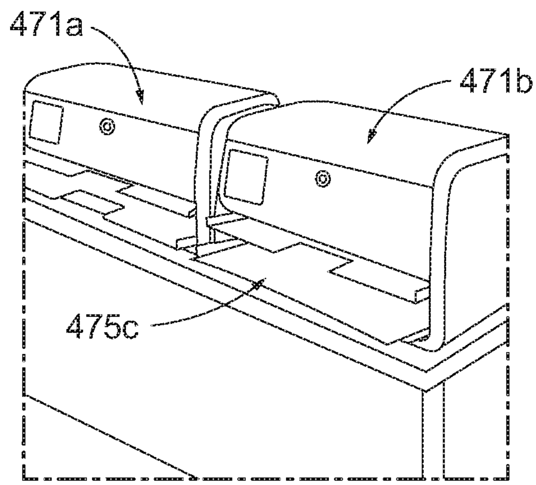
Figure 8B:
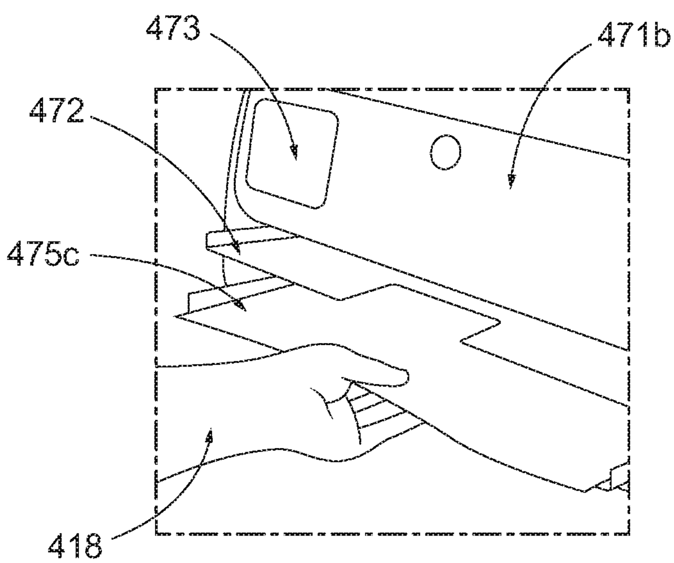
Figure 9:
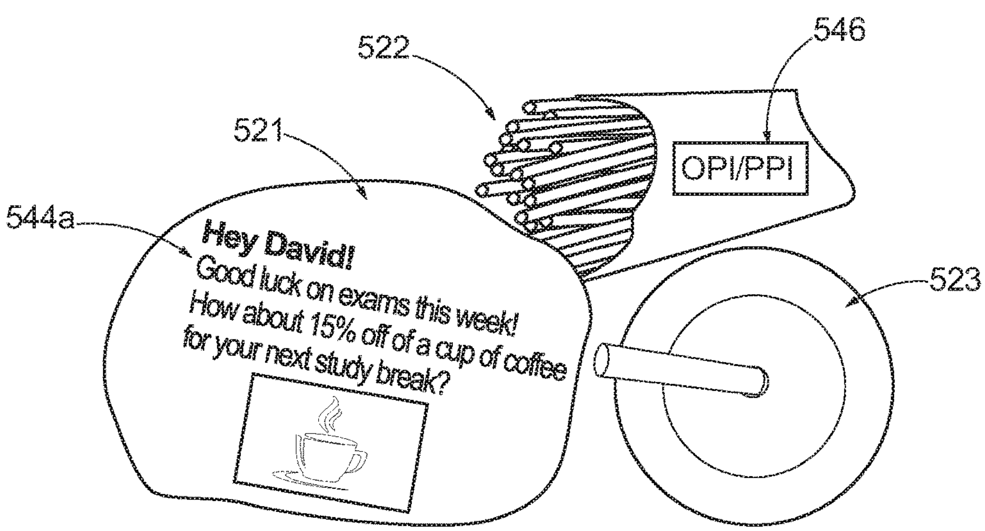
Figure 10A:
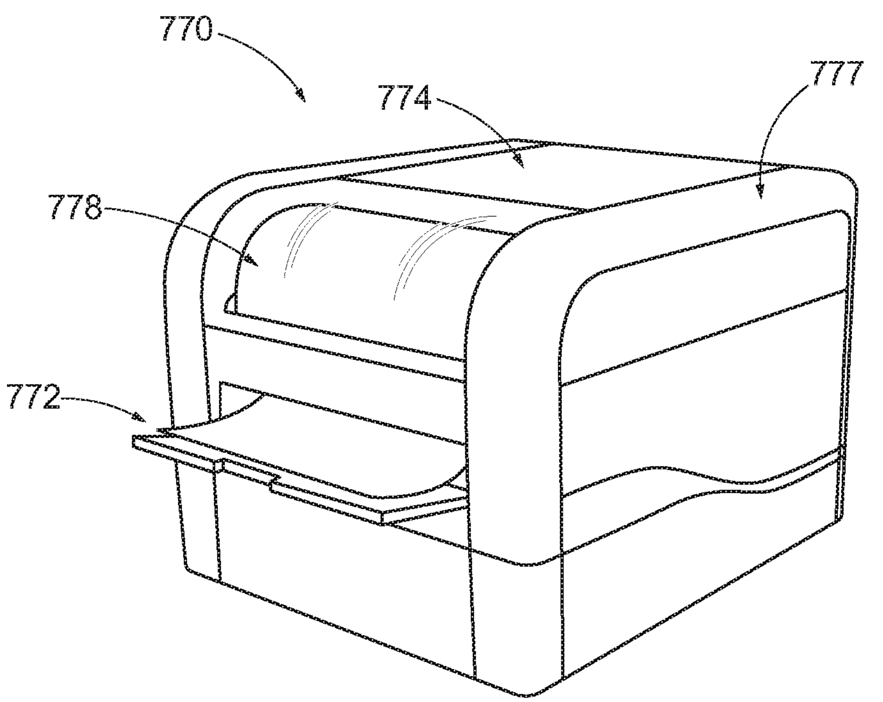
Figure 10B:
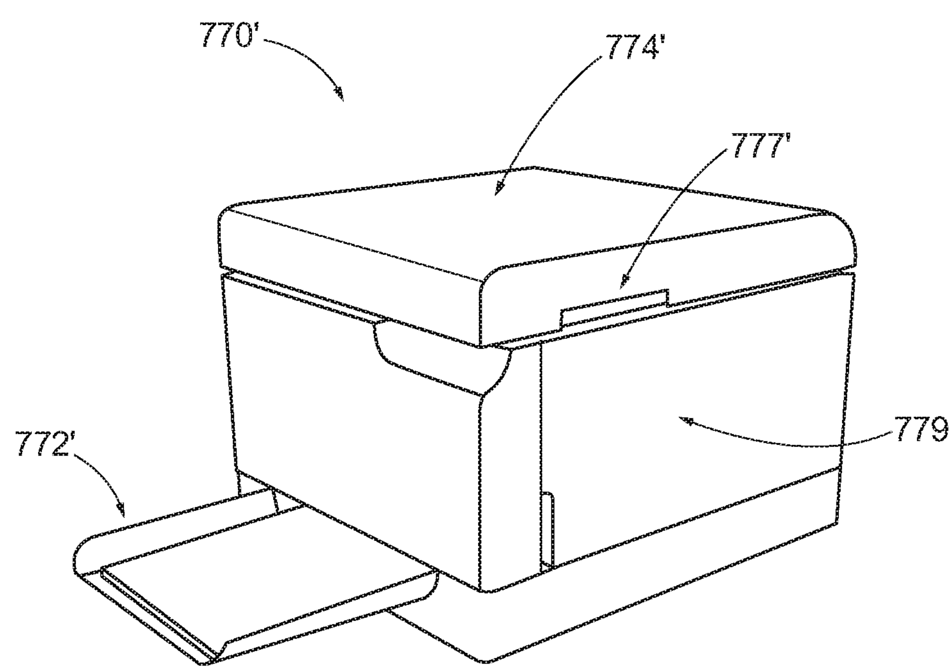
Figure 10C:
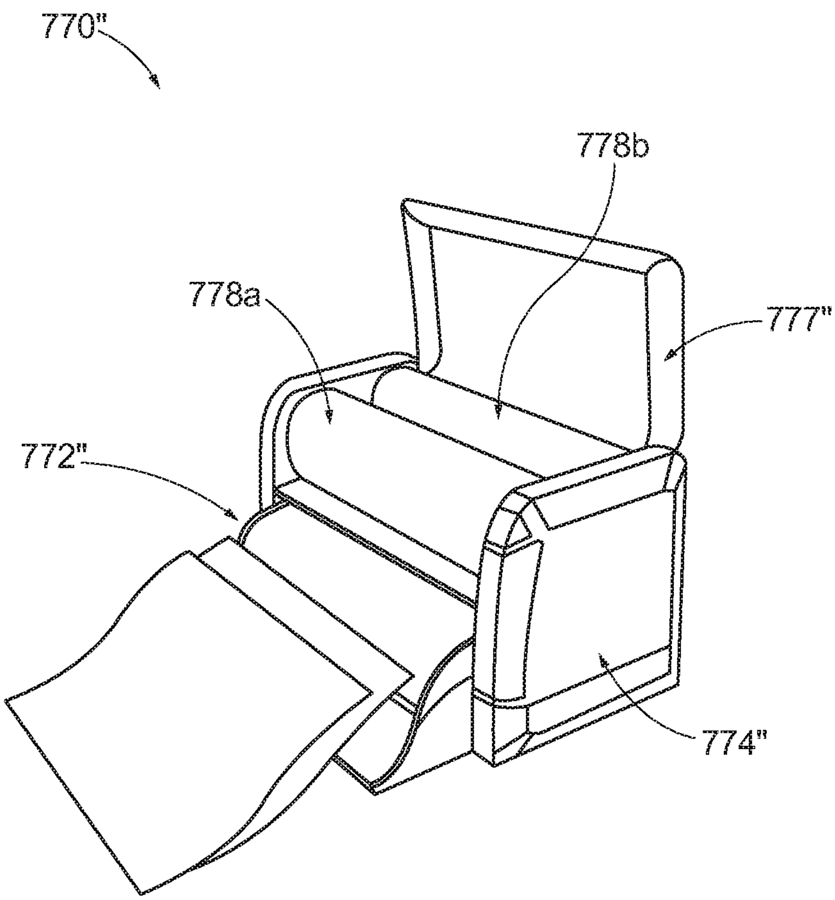
Figure 11:
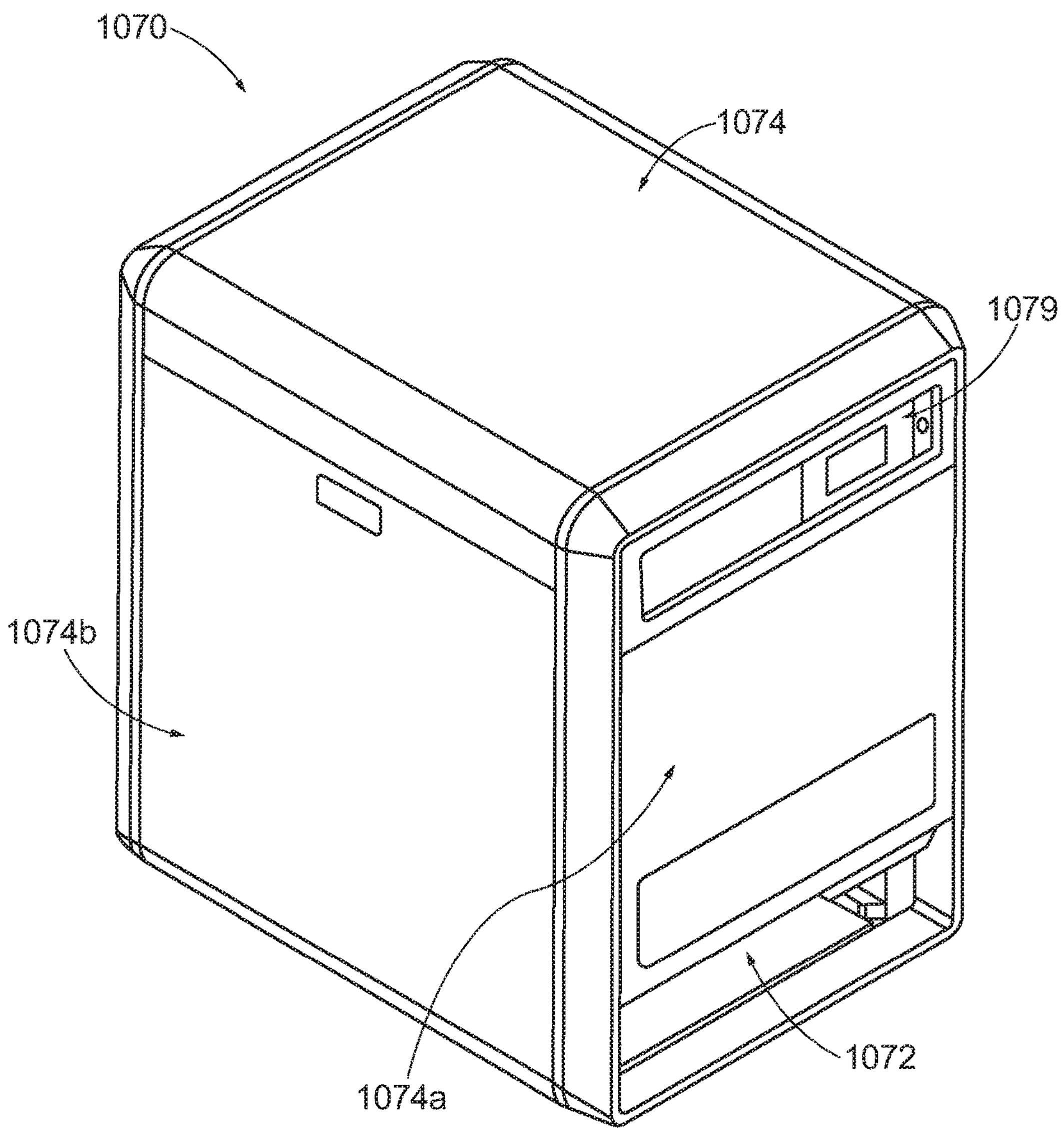
Figure 11A:
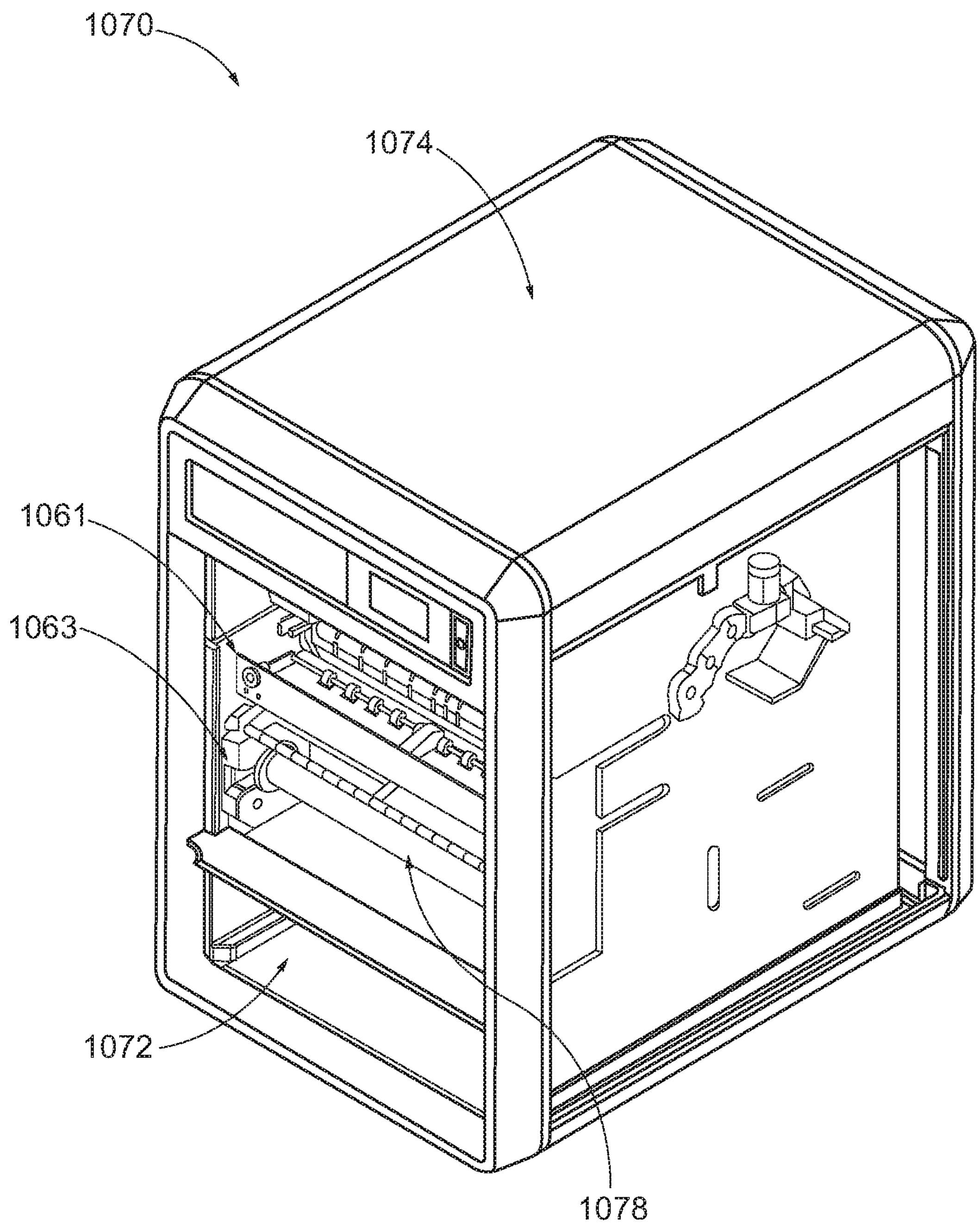
Figure 11B:
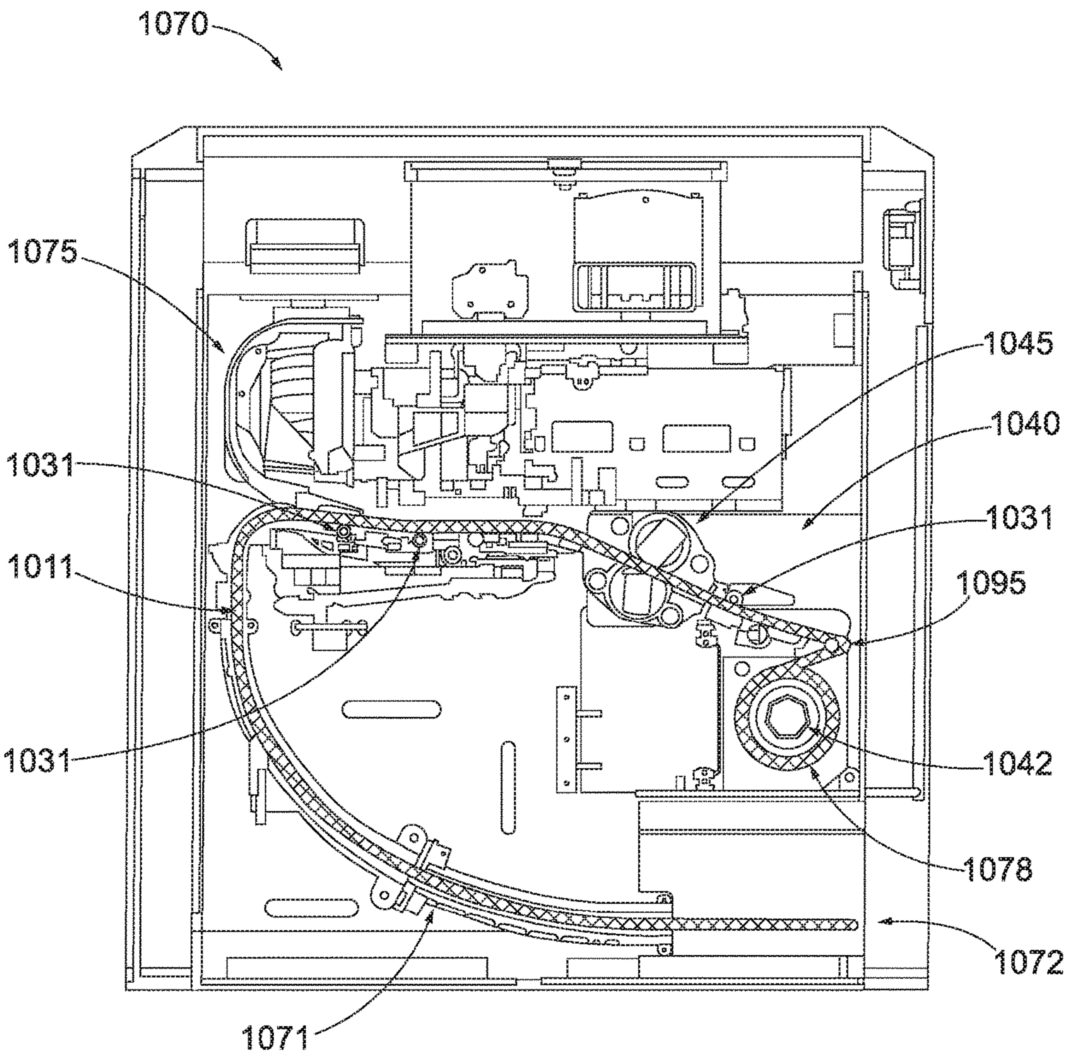
Figure 11C:
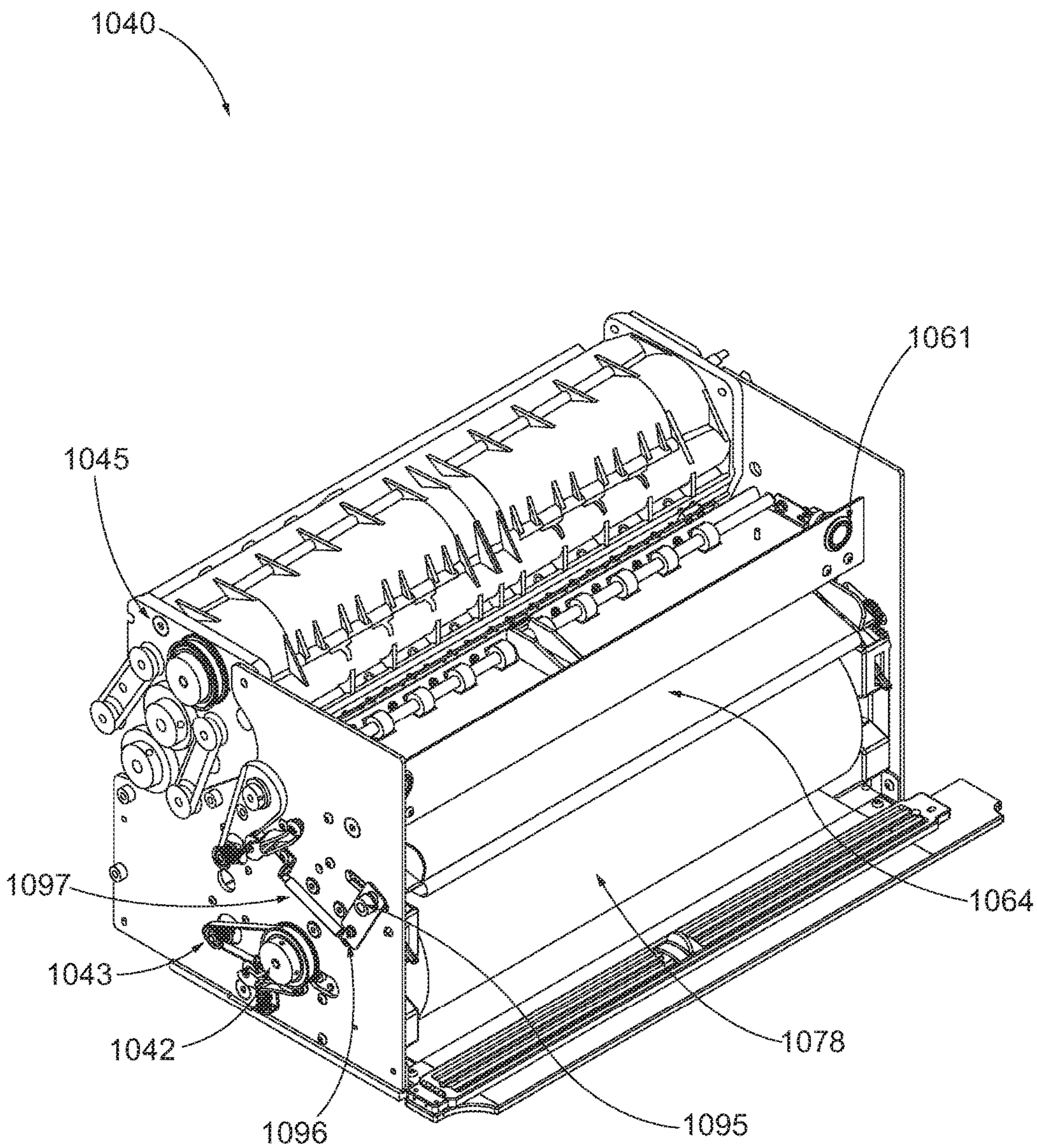
Figure 11D:
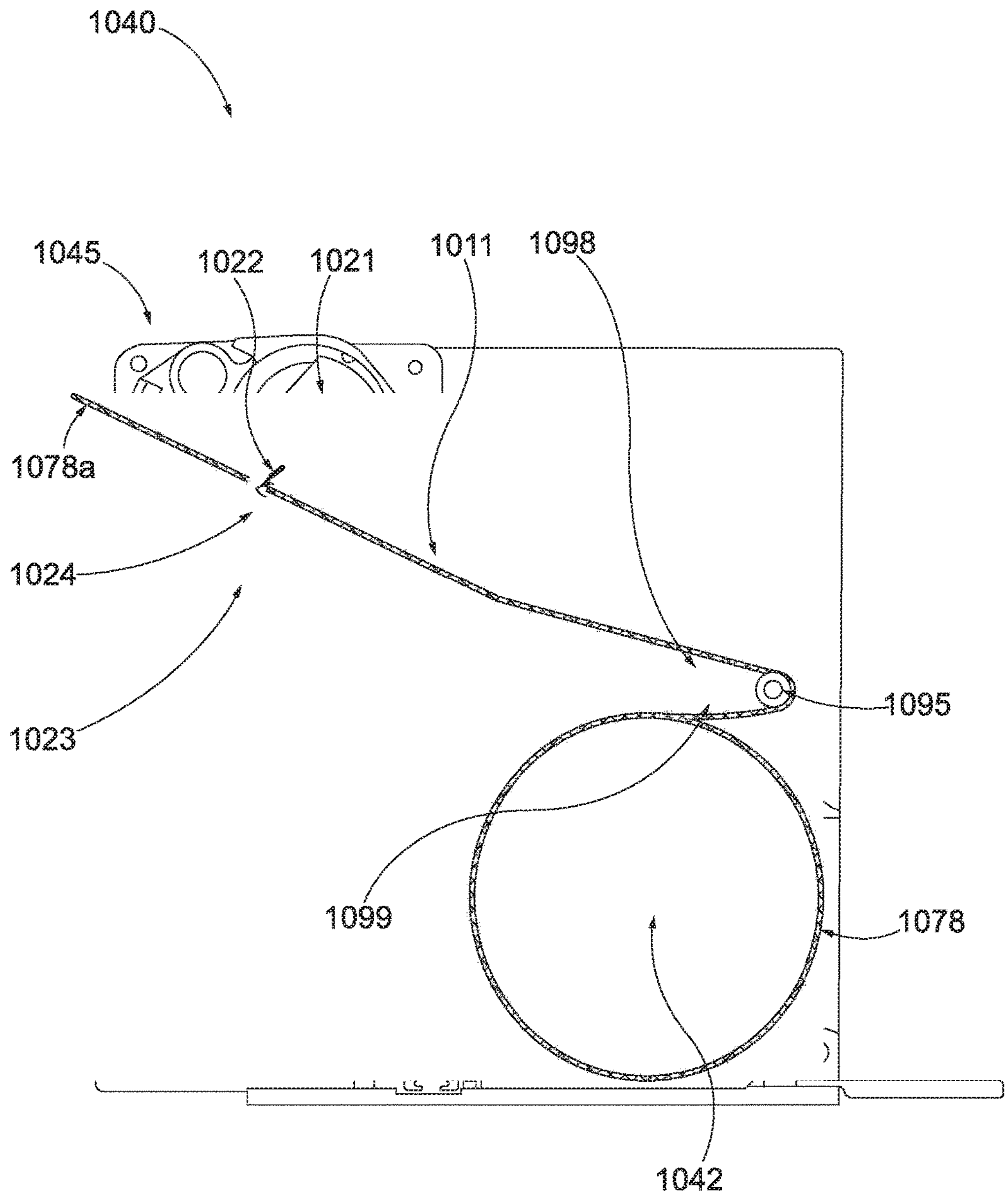
Figure 11E:
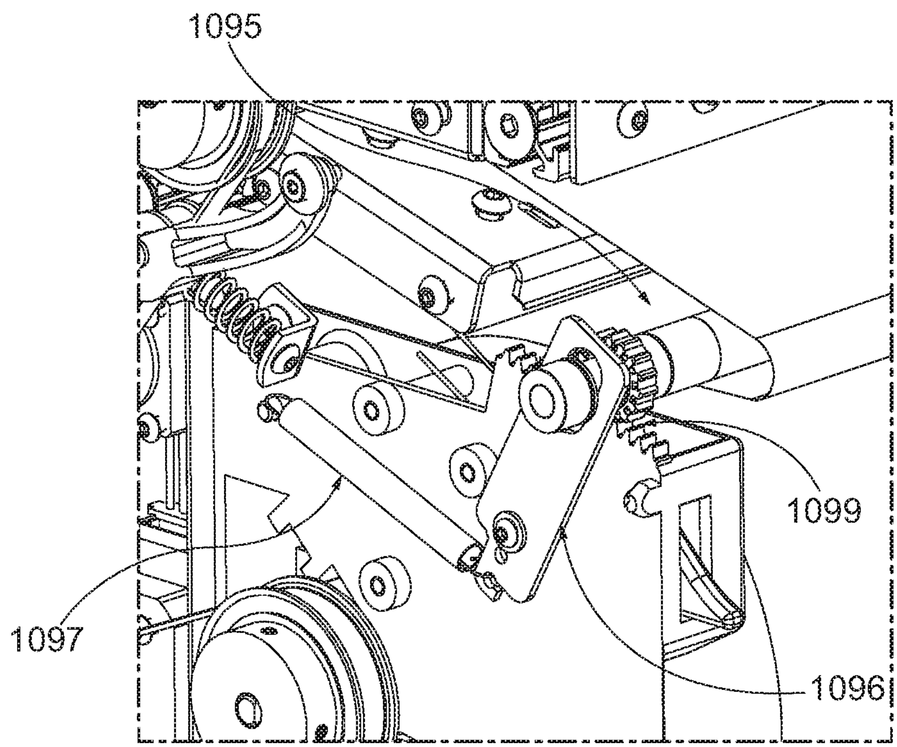
Figure 11F:
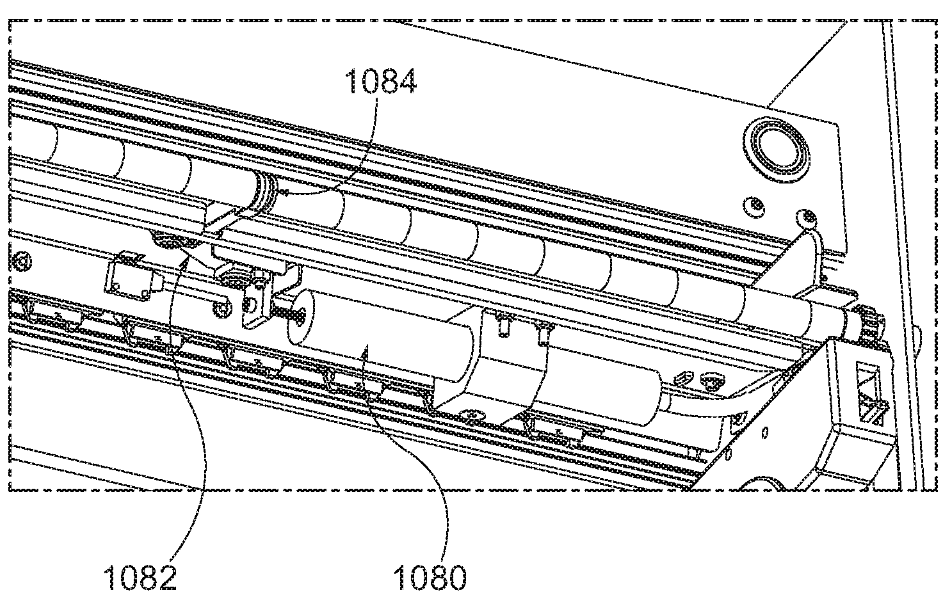
Figure 11G:
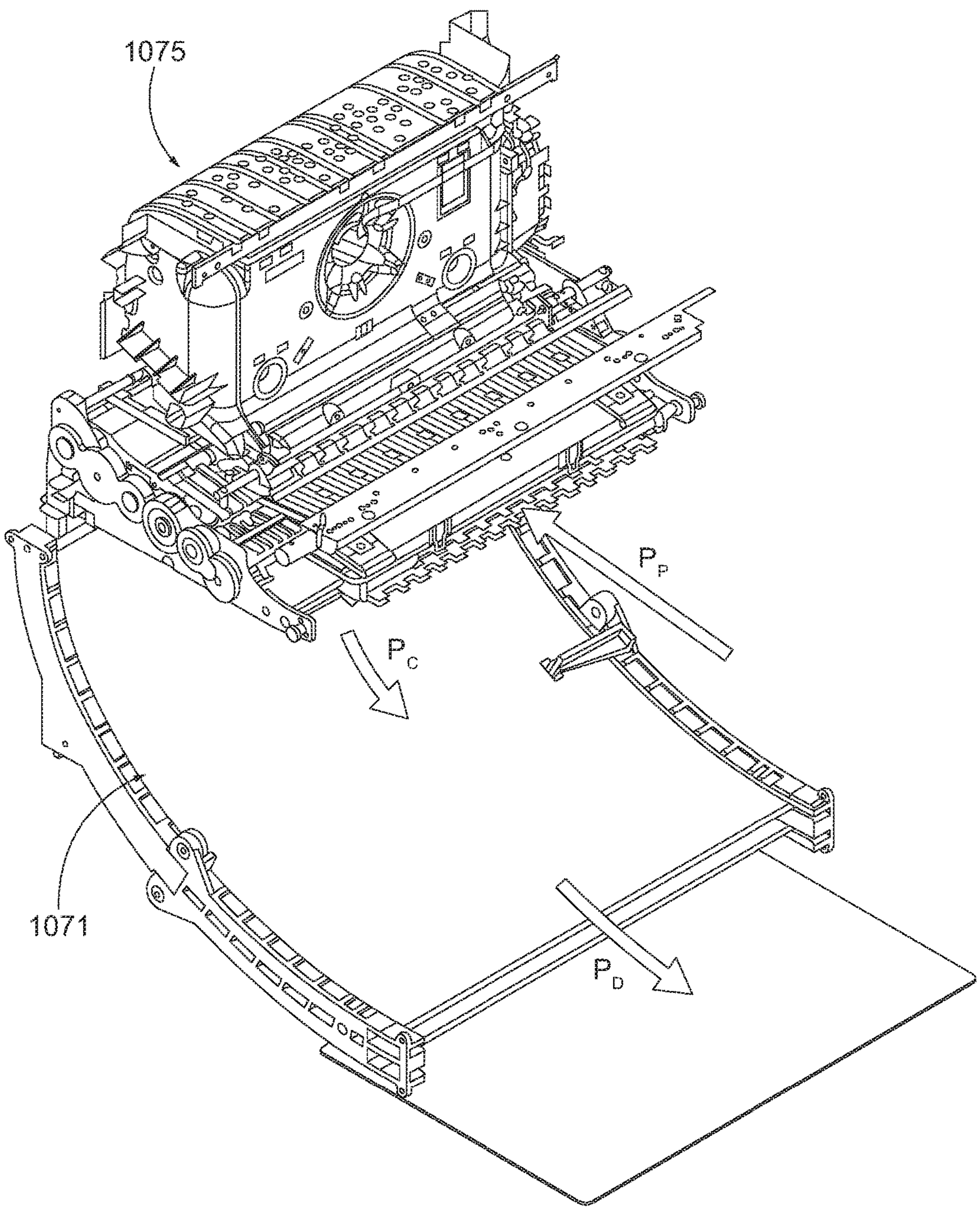
Figure 12A:
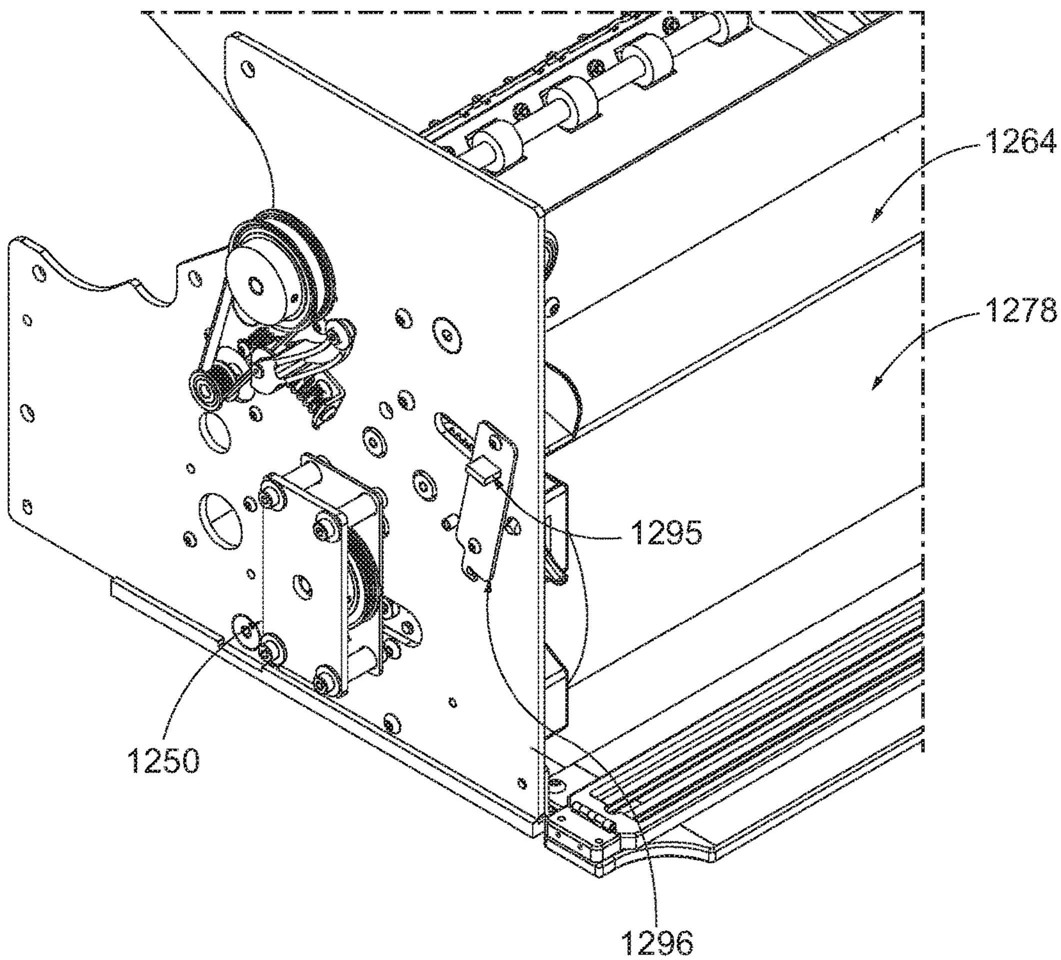
Figure 12B:
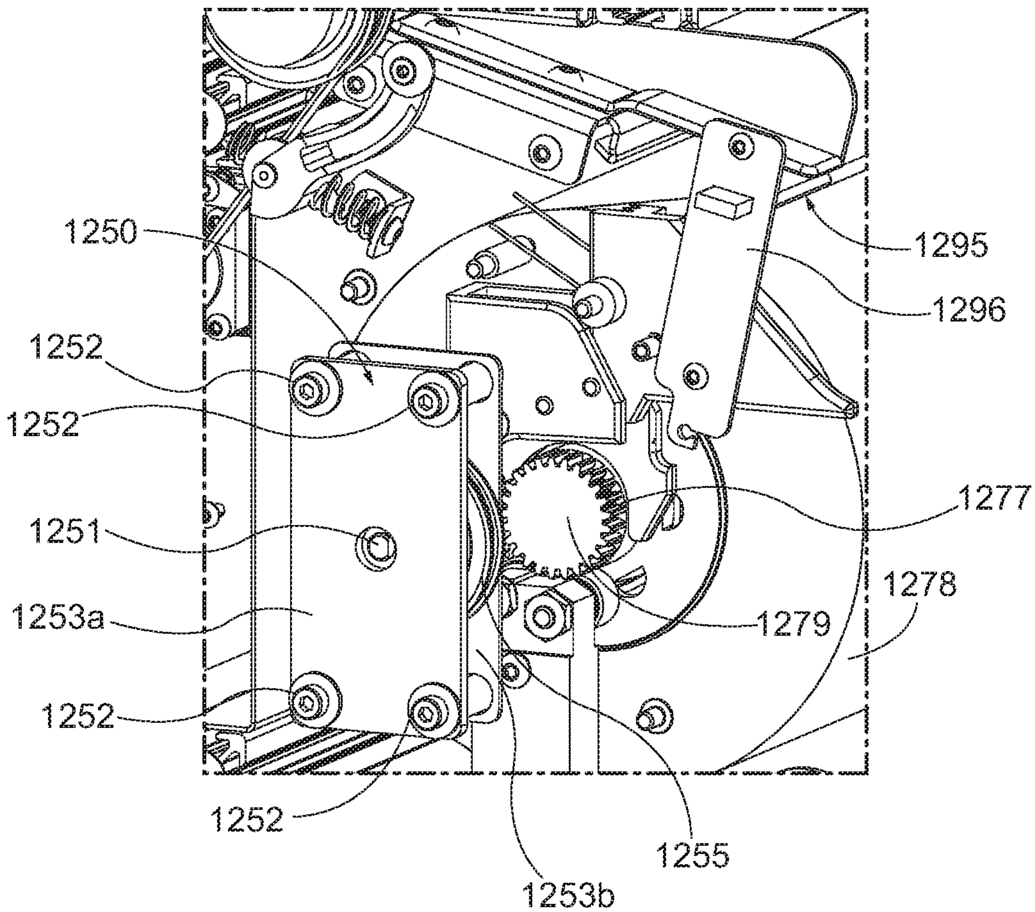
Figure 12C:
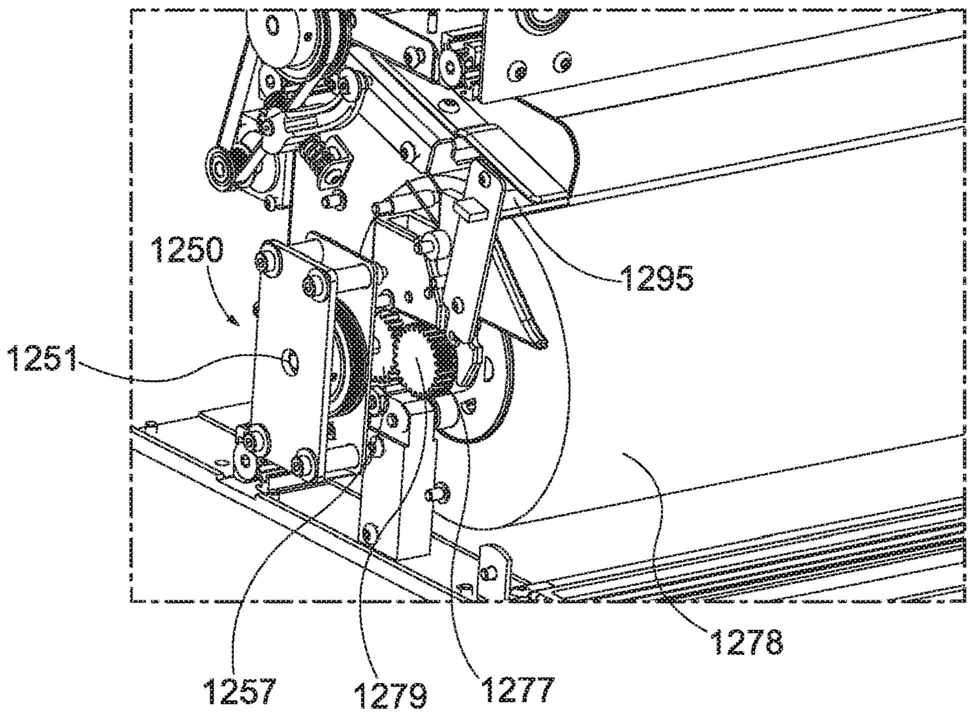
Figure 12D:
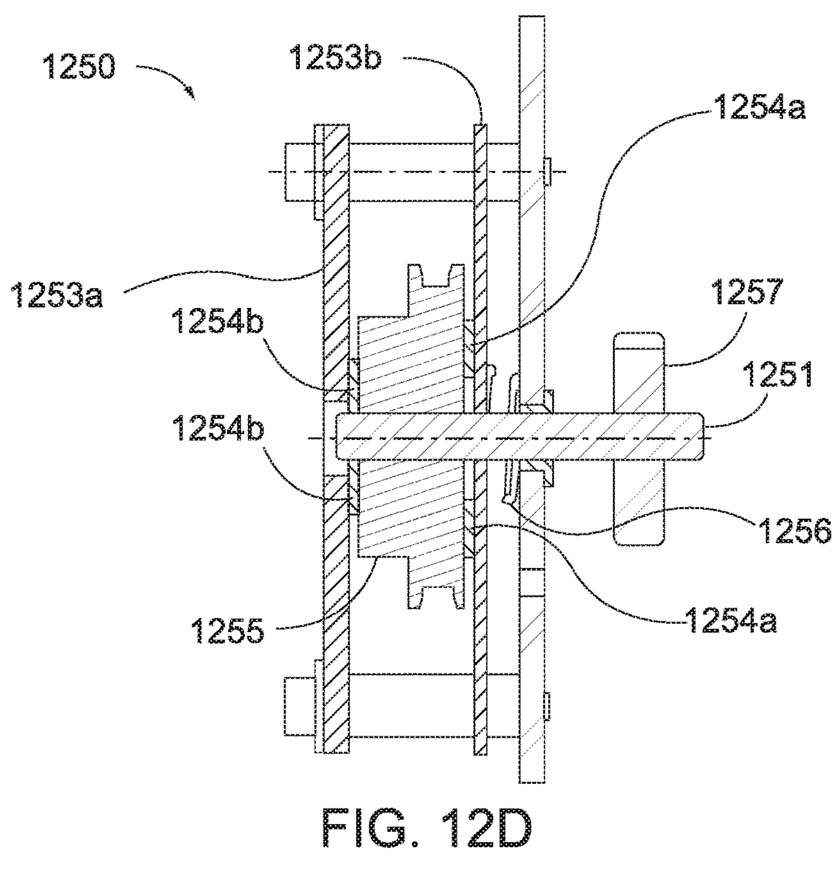
Figure 13:
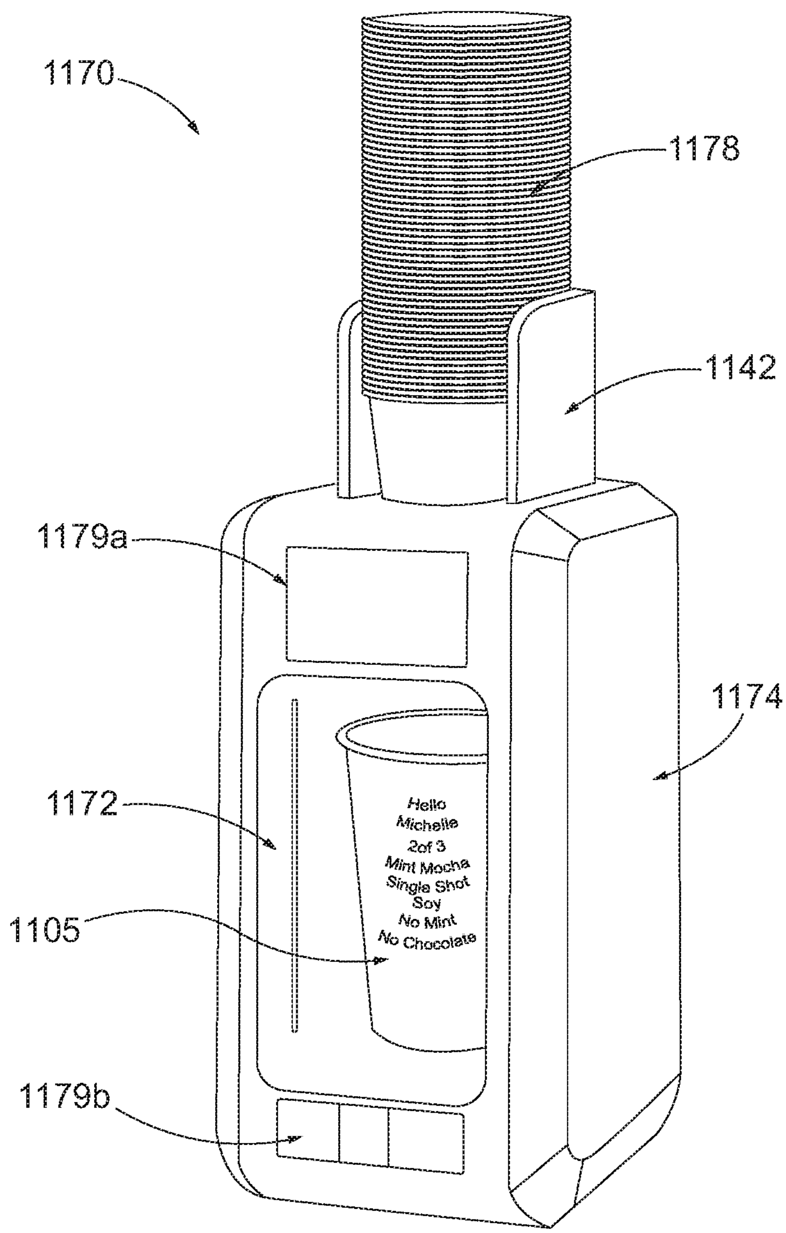
Figure 13A:
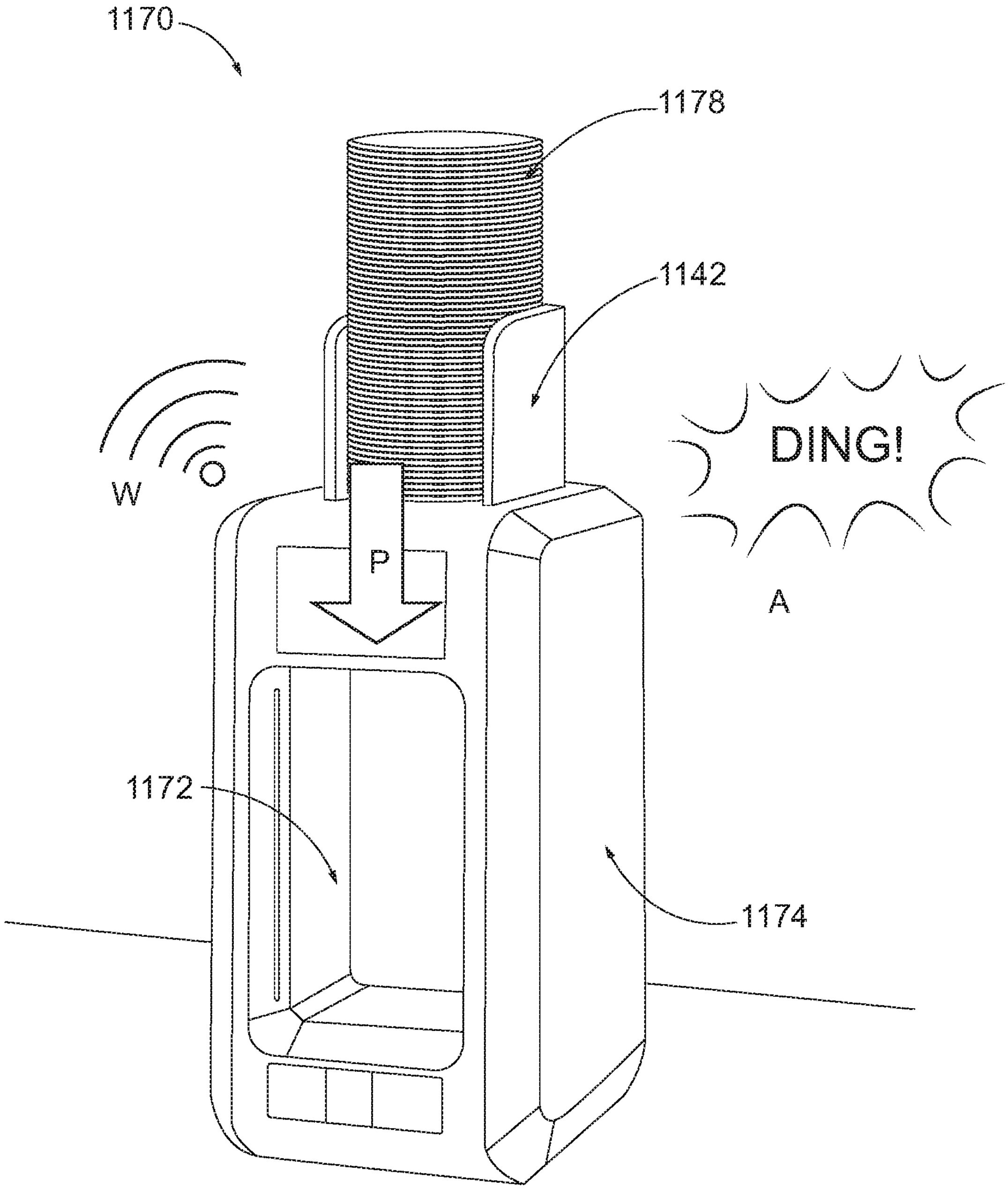
Figure 13B:
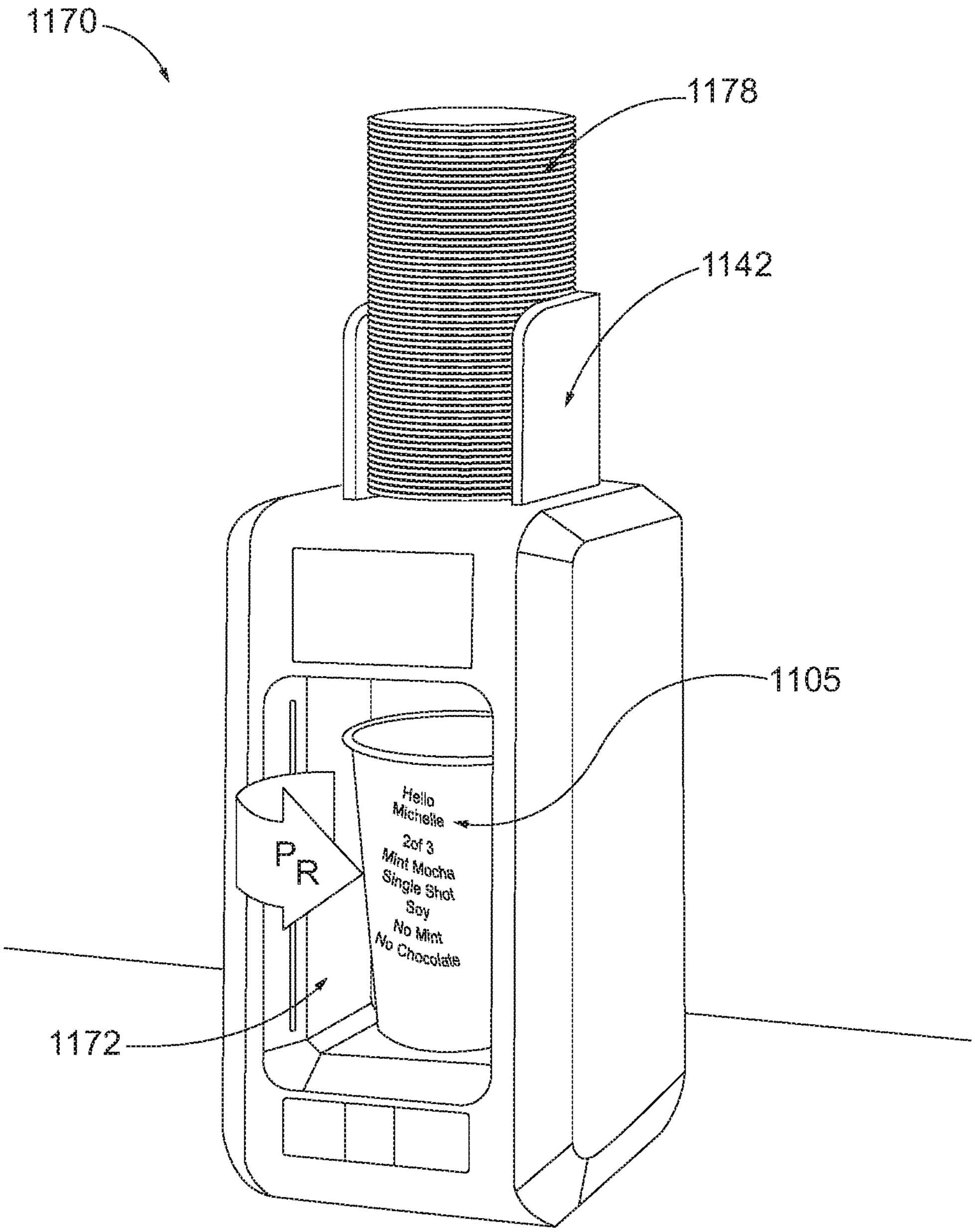
Figure 13C:
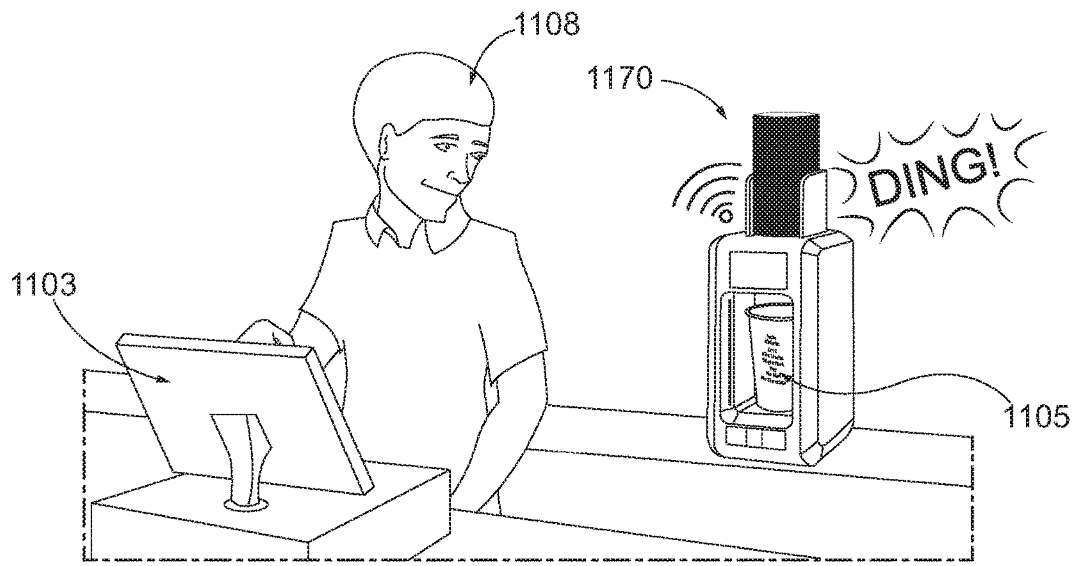
Figure 13D:
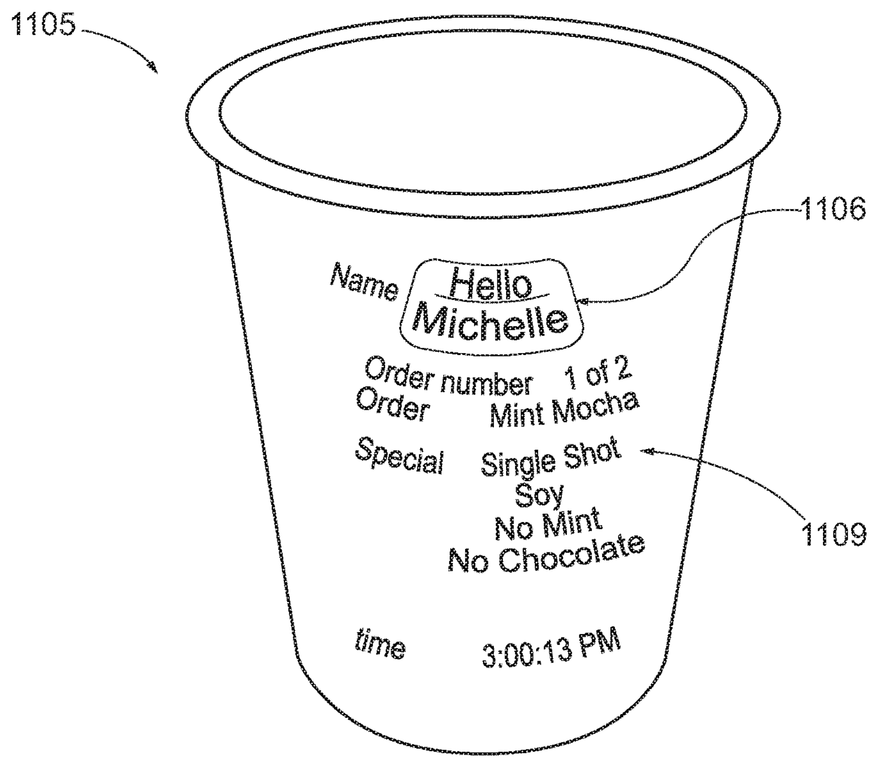
Figure 13E:
Figure 13F:
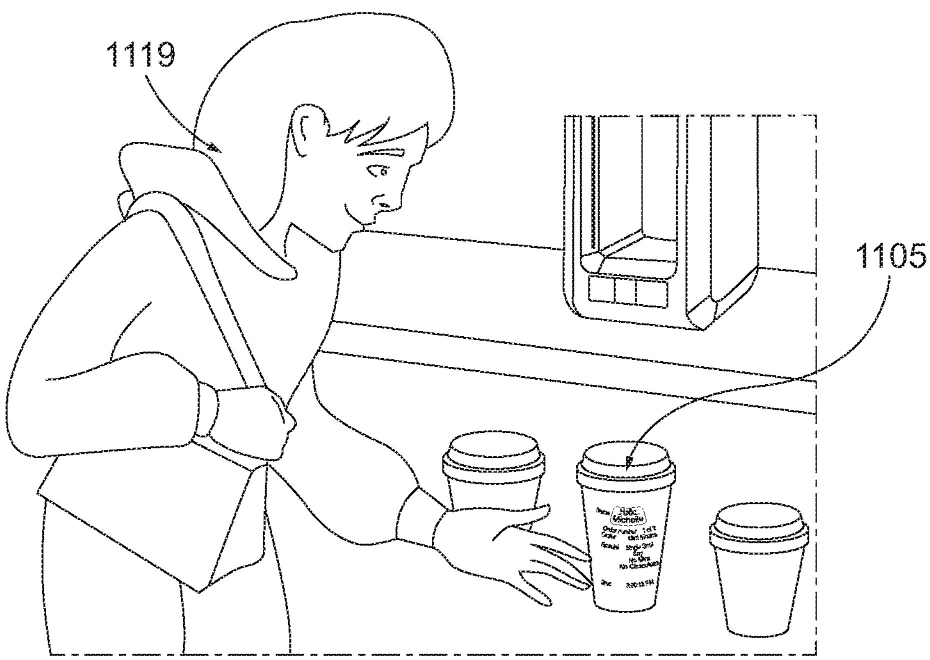
Figure 14:
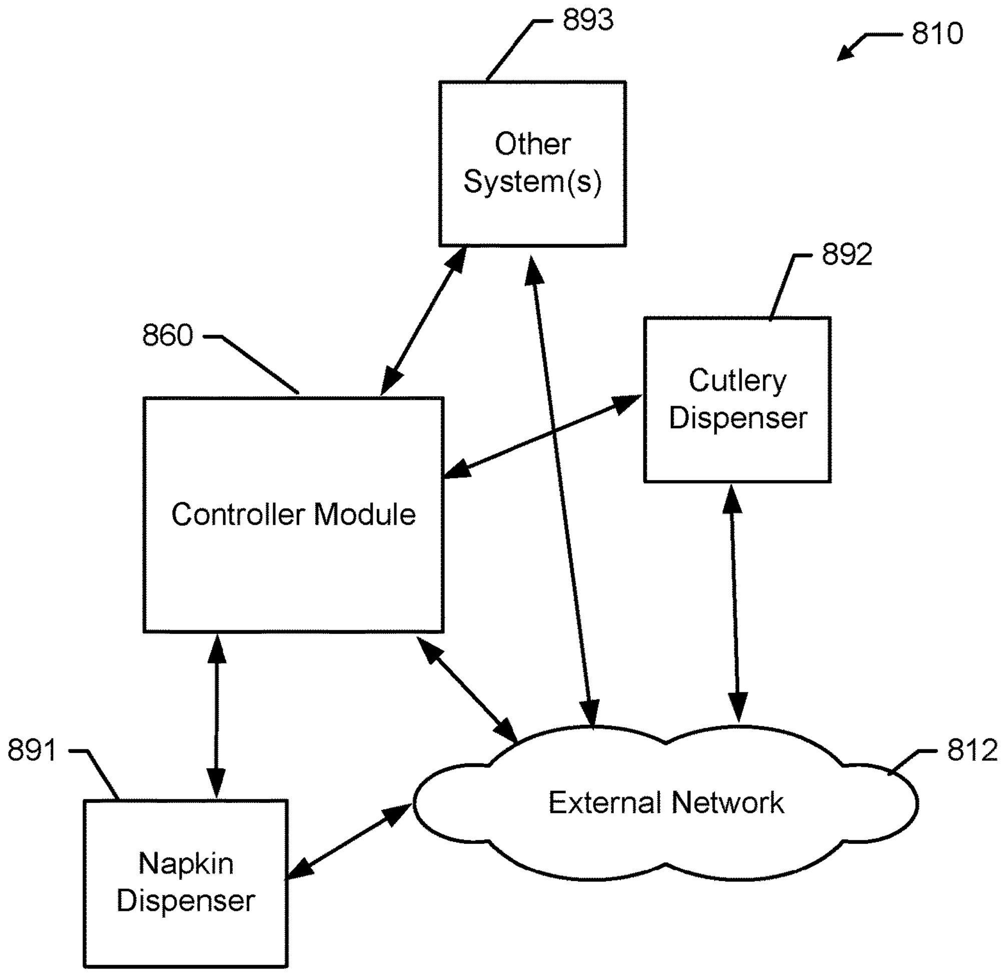
Figure 15:
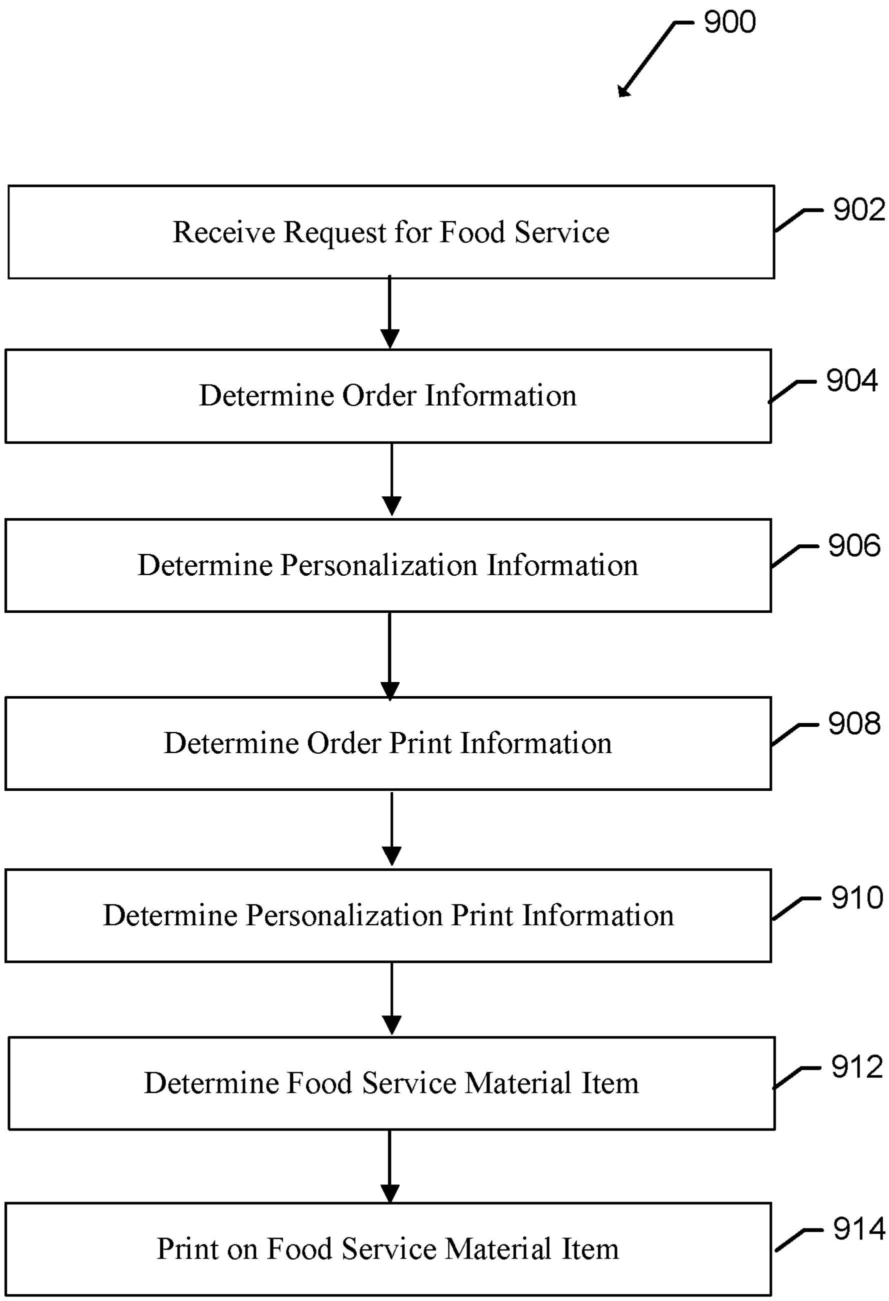

FIGS. 7, 7A, 7B, and 7C show block diagrams of example food service material dispensers that include print devices, in accordance with some embodiments discussed herein;

FIG. 8A shows two example food service material printers for use with an example on-demand food service material printing system, in accordance with some embodiments discussed herein;

FIG. 8B illustrates dispensing of a printed food service material item, in accordance with some example embodiments discussed herein;

FIG. 9 shows example food orders, where some of the food orders are packaged in a food service material item with printed information thereon, in accordance with example embodiments described herein;

FIGS. 10A-10C illustrate example dispensers for use with example on-demand food service material printing systems, in accordance with some example embodiments discussed herein;

FIG. 11 illustrates an example food service material dispenser, in accordance with some example embodiments discussed herein;

FIG. 11A illustrates a perspective view of the dispenser shown in FIG. 11, where the front panel and side panel have been removed, in accordance with some example embodiments discussed herein;

FIG. 11B illustrates some inner components of the example dispenser shown in FIG. 11, where the dispensing path of the food service material is illustrated, in accordance with some example embodiments discussed herein;

FIGS. 11C-D illustrate a roll holder and cutting arrangement assembly for the dispenser shown in FIG. 11, in accordance with some example embodiments discussed herein;

FIGS. 11E-F illustrate close-up views of an example tensioner used in conjunction with the example food service material dispenser shown in FIG. 11, in accordance with some example embodiments;

FIG. 11G illustrates a printer and chute assembly for the dispenser shown in FIG. 11, in accordance with some example embodiments discussed herein;

FIG. 12A illustrates a close-up view of an example guide bar used in conjunction with example food service material dispensers described herein, in accordance with some example embodiments;

FIG. 12B illustrates a close-up view of an example clutch mechanism used in conjunction with a guide bar, where portions of the dispenser are removed for explanation purposes;

FIG. 12C illustrates another close-up view of the example guide bar and clutch mechanism, with a portion of the dispenser housing removed for explanation purposes;

FIG. 12D shows a cross-sectional view of a portion of the dispenser and the clutch mechanism, in accordance with some example embodiments;

FIG. 13 illustrates an example cup dispenser, in accordance with some example embodiments discussed herein;

FIGS. 13A-B illustrate an example path for movement/rotation of a cup from a cup source through the cup dispenser shown in FIG. 13, in accordance with some example embodiments discussed herein;

FIG. 13C illustrates an example food service environment with a food service provider and the example cup dispenser shown in FIG. 13, in accordance with some example embodiments discussed herein;

FIG. 13D illustrates an example printed cup, in accordance with some example embodiments discussed herein;

FIG. 13E illustrates a scenario where the a food service provider prepares the food service order in the printed cup, in accordance with some example embodiments discussed herein;

FIG. 13F illustrates a scenario where a customer is able to easily locate her food service order using the printed cup, in accordance with some example embodiments discussed herein;

FIG. 14 shows a block diagram of an example control system for controlling one or more additional dispensers/components/systems, such as various example front or back-of-house dispensers, in accordance with example embodiments described herein; and FIG. 15 illustrates a flowchart of an example method for providing on-demand food service material printing for food service, in accordance with some embodiments discussed herein.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Example On-Demand Food Service Material Printing System

Figure 1:
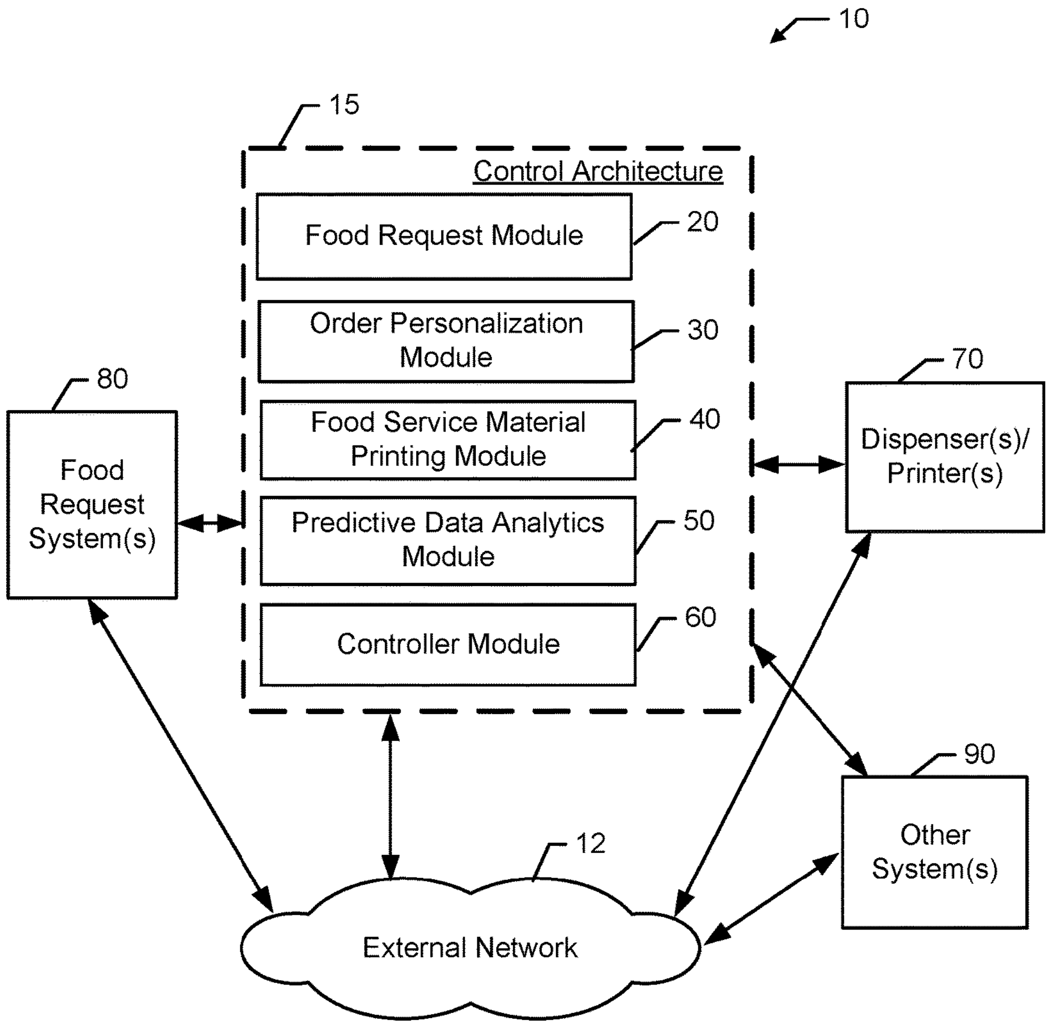
FIG. 1 shows a block diagram of an example on-demand food service material printing system, in accordance with some embodiments discussed herein.

FIG. 1 shows a block diagram of an example on-demand food service material printing system 10 for food service. The depicted system 10 includes a number of modules, architectures, systems, and/or devices that are configured to work together to perform various functions, including providing on-demand food service material printing. In the depicted embodiment, the system 10 includes a control architecture 15, food request system(s) 80 (e.g., point-of-sale (POS) system(s)), dispenser(s)/printer(s) 70, an external network 12, and other system(s) 90 (e.g., front of house (FOH) or back-of-house (BOH) system(s)).

In some embodiments, various controllers, including for example from the control architecture 15, the food request 80, the dispenser(s)/printer(s) 70, the other system(s) 90, or a remote computer server, may be configured to communicate with and/or control operation of various components of the system 10 such as according to various functions/modules described herein. In such a regard, while the depicted embodiment shows various particular modules, architectures, systems, and/or devices, some embodiments of the present invention contemplate many variations, including additional modules, architectures, systems, and/or devices and/or combinations in whole or part thereof. Additionally, while much of the described examples are detailed for printing on food wrap, some embodiments of the present invention are contemplated for extension into other food service material printing, including, for example, food wrap, food containers, cups, carry-out bags, tray liners, napkins, pouches, among many other things.

The control architecture 15 may include one or more modules that are configured to perform various functions of the system 10. In the depicted embodiment, the control architecture 15 includes a food request module 20, an order personalization module 30, a food service material printing module 40, a predictive data analytics module 50, and a controller module 60. Though shown as distinct modules, some modules may be configured to share functionality. Likewise, various combinations of functionality is contemplated across the various modules.

As described in more detail herein, the control architecture 15 provides logic and control functionality used during utilization of the various modules and/or systems of the on-demand food service material printing system 10. The control architecture 15 and/or its various modules may comprise (or be connected to) hardware and software to enable performance of various functions described herein. Along these lines, the modules may share functionality across distinct hardware (e.g., among various servers, controllers, various systems described herein (e.g., food request system(s), printer(s), other system(s)), etc.) including in different locations and/or different apparatuses.

The control architecture 15 may comprise one or more suitable electronic device(s)/server(s) capable of executing described functionality via hardware and/or software control. In some embodiments, the control architecture 15 may include one or more user interfaces (not shown), such as for displaying information and/or accepting instructions. The control architecture 15 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The control architecture 15 may be configured to communicate with various components of the system 10, such as directly or through an external network 12. In some embodiments, the control architecture 15 may be operably coupled with one or more components of the system 10, including for example, the food request system(s) 80, dispenser(s)/printer(s) 70, other system(s) 90, controllers, processors, communication interfaces, and other components (such as described herein) to provide functionality for the system 10. For example, depending on the components, the control architecture 15 may be operably coupled such as through use of solid-core wiring, twisted pair wiring, coaxial cable, fiber optic cable, mechanical, wireless, radio, infrared, or any other suitable connection. In this regard, depending on the components, the operable coupling may be through one or more intermediate controllers or mechanical coupling, such as used for controlling some components (e.g., controlling operation of the printer(s) 70). In some embodiments, the control architecture 15 may be configured to provide one or more operating signals to these components and to receive data from these components.

The control architecture 15 may include one or more processors coupled to a memory device. Control architecture 15 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, controller may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In this regard, in some embodiments, the control architecture 15 may be configured to execute computer program code instructions to perform aspects of various embodiments of the present invention described herein.

In some embodiments described herein, various components (e.g., modules, systems, architectures) of the system 10 may be configured to determine various things. As used herein, "determine" is not meant to be limiting and may include, for example, determining a selection, determining something from one or more instructions, generating something.

Example Food Request/Module and/or Systems

The control architecture 15, such as through the food request module 20, is configured to receive a request for food service by a customer, such as from one or more food request systems 80. The request for food service may include order information corresponding to a food order by the customer. Such a food order may include any consumable (e.g., a drink) and is not meant to be limiting.

In some embodiments, the request may include a purchase (e.g., a sale, a utilization of loyalty points, etc.) for the request, such as using a point-of-sale system. Additionally or alternatively, some or all of the request may not include a purchase. For example, the food request may be requested in conjunction with a non-purchase program (e.g., all-inclusive resort, charity, etc.) and, thus, no purchase or sale may be required.

In some embodiments, a customer may provide one or more custom order characteristics along with the request for food service. Example custom order characteristics may include order preferences, dietary preferences, exceptions to a standard food order (e.g., extra cheese or no tomatoes), among others.

The food request module 20 may be further configured to determine order information based on the request for food service. For example, the food request module 20 may determine one or more food orders (e.g., food or drink items) that the customer has requested. Additionally, the food request module 20 may determine one or more custom characteristics that are specific to the request, such as being related to one or more of the food orders for the request.

Depending on the configuration of the food service and/or store for food service, example on-demand food service material printing systems 10 may include one or more food request systems for interaction with a customer. Some example food request systems 80 include a self-order kiosk, a point-of-sale (POS) operator terminal, an application stored on a remote device (such as a customer's personal device), and a computer server.

Figure 2:
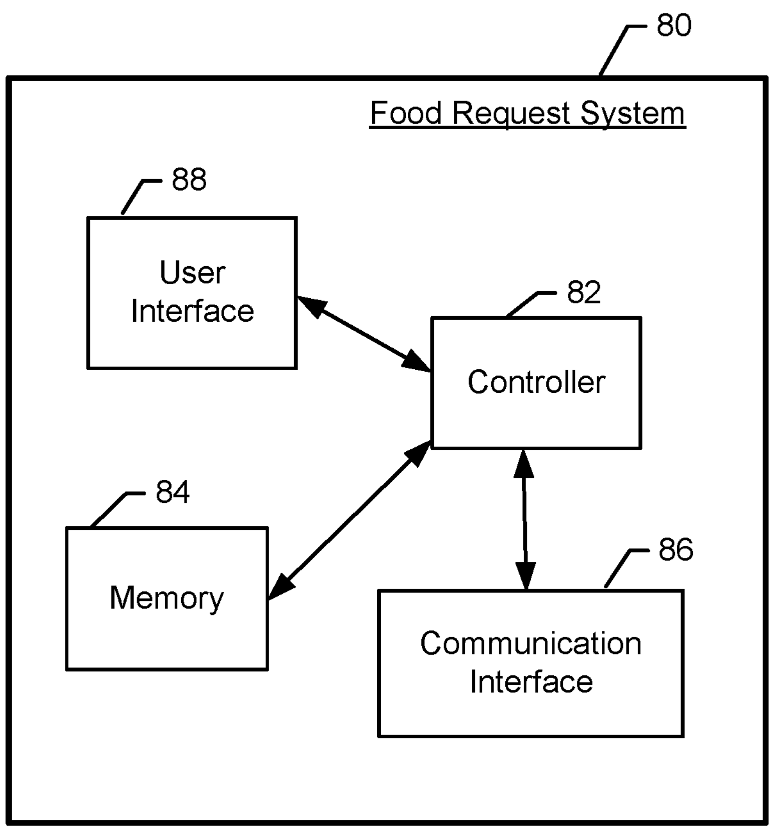
FIG. 2 shows a block diagram of an example food request system, in accordance with some embodiments discussed herein.

With reference to FIG. 2, an example food request system 80 may comprise hardware and/or software capable of performing one or more functions described herein. In this regard, the food request system 80 may include a controller 82, a memory 84, a communication interface 86, and a user interface 88.

The controller 82 may be any means configured to execute various programmed operations or instructions stored in a memory device such as a device or circuitry operating in accordance with software or otherwise embodied in hardware or a combination of hardware and software, thereby configuring the device or circuitry to perform the corresponding functions of the controller 82 as described herein. In this regard, the controller 82 may be configured to receive one or more requests for a food order from a customer, such as through the user interface 88. Additionally, in some embodiments, the controller 82 may receive and/or determine additional information regarding the customer (e.g., personalization information). The controller 82 may also be configured to send gathered information and/or instructions to other devices, systems, or modules to perform various functions described herein. In some embodiments, the controller 82 may be configured to operate according to one or more modules described herein.

The memory 84 may be configured to store instructions, computer program code, order data (e.g., order information), personalization information, and other data/information associated with the food request system 80 in a non-transitory computer readable medium for use, such as by the controller 82.

The communication interface 86 may be configured to enable connection to external systems (e.g., an external network 12, one or more dispenser(s)/printer(s) 70, a customer's mobile device, a computer server, the control architecture 15, and/or one or more other system(s)/device(s)). In some embodiments, the communication interface 86 may comprise one or more transmitters configured to transmit, for example, one or more signals according to example embodiments described herein. Likewise, the communication interface 86 may include at least one receiver configured to, for example, receive data according to example embodiments described herein. In some embodiments, the transmitter and receiver may be combined as a transceiver. In this regard, the food request system may be configured for wired and/or wireless communication. In some embodiments, the communication interface 86 may comprise wireless capabilities for WiFi, Bluetooth, or other wireless protocols. In some embodiments, the food request system 80 may be connected, such as through Bluetooth, to one or more printer(s) 70 such as to enable performance of various functions herein.

The user interface 88 may be configured to receive input from a user and/or provide output to a user. The user interface 88 may include, for example, a display, a keyboard, keypad, function keys, mouse, scrolling device, input/output ports, touch screen, or any other mechanism by which a user may interface with the system. Although the user interface 88 is shown as being directly connected to the controller 82 and within the food request system 80, the user interface 88 could alternatively be remote from the controller 82 and/or food request system 80. Likewise, in some embodiments, other components of the food request/POS system 80 could be remotely located.

Figure 2A:
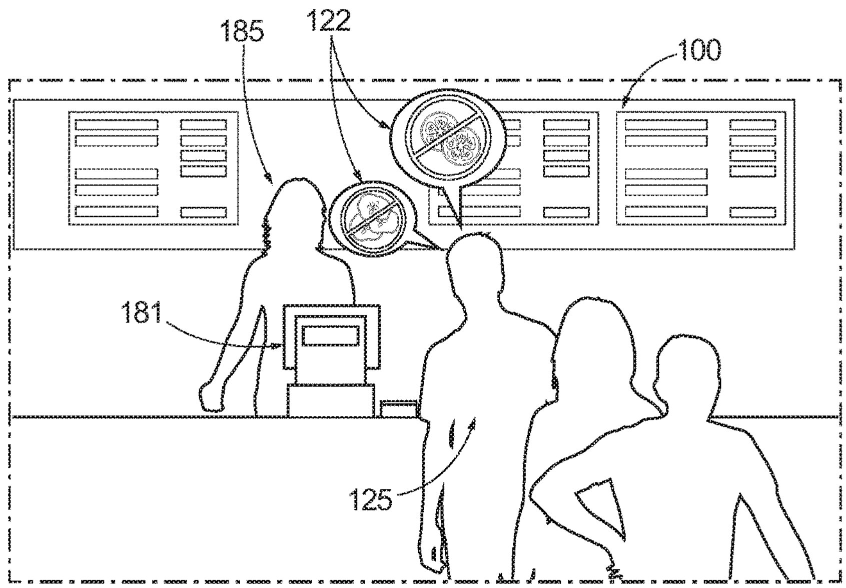
FIGS. 2A-2C illustrate example ways to submit a request for food service for an example on-demand food service material printing system, in accordance with some embodiments discussed herein.

FIG. 2A illustrates an example food service environment 100 where a customer 125 has placed a request for a food service with a food service employee 185 that is using a POS operator terminal 181. In the depicted illustration, the customer 125 has ordered a hamburger (e.g., a food order) with no tomatoes and no pickles (e.g., custom order characteristics). In response, the food service employee 185 has entered the request into the POS operator terminal 181. In such an example, the food request module 20 receives the request for food service from the POS operator terminal 181.

Figure 2B:
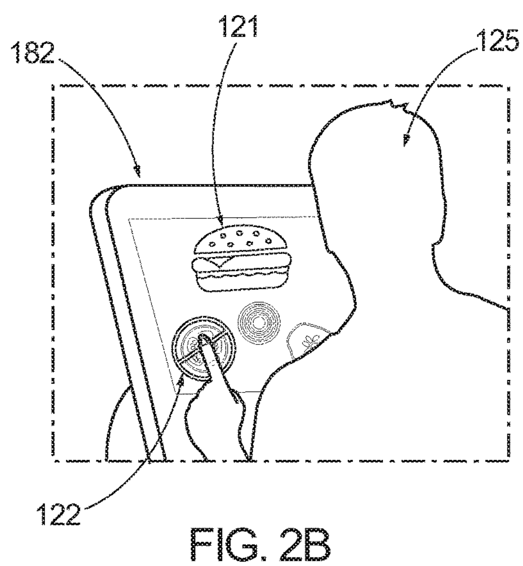

FIG. 2B illustrates a similar request for food service by a customer 125 at a self-order kiosk 182. In the illustration, the customer 125 selects the food order 121 (e.g., a hamburger) and provides one or more custom characteristics (e.g., no tomatoes). In such an example, the food request module 20 receives the request for food service from the self-order kiosk 182.

Figure 2C:
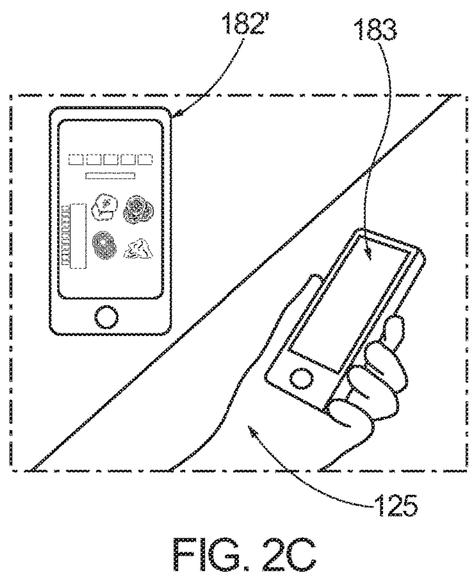

FIG. 2C illustrates two example ordering options, namely a self-order kiosk 182' and a customer's personal device 183. In this regard, in some embodiments, the customer 125 may submit a request for food service through a remote device, such as a mobile phone device 183. That request may then be provided to the food request module 20 such as through an application on the user's mobile device or through a computer server (e.g., through an online ordering system).

As noted herein, although the above descriptions detail examples of a self-order kiosk, a POS operator terminal, and an application on a user's mobile device, other food request systems are contemplated by various example embodiments. For example, a user may place a food request through an online ordering system. In such an example, or through other contemplated food request systems (e.g., self-order kiosk, application, POS operator terminal, etc.), the food service request may be received through a computer server (e.g., an external network) that may be connected to the system 10.

Example Personalization Information

The control architecture 15, such as through the order personalization module 30, is configured to determine personalization information related to the customer or store. Some example personalization information includes the customer's name, preferences, allergies, order/customer profile, other identifiers, preferred language(s), order history, social media data, other external data (including purchase and trend data), among other things.

In some embodiments, the personalization information may be gathered in various different ways. For example, in some embodiments, the customer may provide personalization information during the request. In some embodiments, personal information may be gathered based on the request. For example, the customer may be signed in to a profile during submittal of the request. In some embodiments, the personalization information may be gathered from purchase information provided during purchase of the food service (e.g., from the credit card, an account for the customer, a loyalty card, etc.). In some embodiments, personalization information may be gathered from publicly available data related to the customer, such as through social media, other databases, etc. In some embodiments, personalization information may be gathered, such as with the permission of the customer, from one or more personal devices of the customer - such as data stored on the device (e.g., pictures, profile data, history, online data, etc.). In some embodiments, the personalization information may be related to the location (e.g., region, the specific store, city, etc.) associated with the customer and/or the request for food service.

Example Print Module and Print Determination

The control architecture 15, such as through the food service material printing module 40, is configured to determine print information to print on one or more food service material items. In this regard, in some embodiments, the food service material printing module 40 is configured to communicate with one or more printers 70 to cause the print information to be printed on the food service material item(s) using the one or more printers 70.

Figure 3:
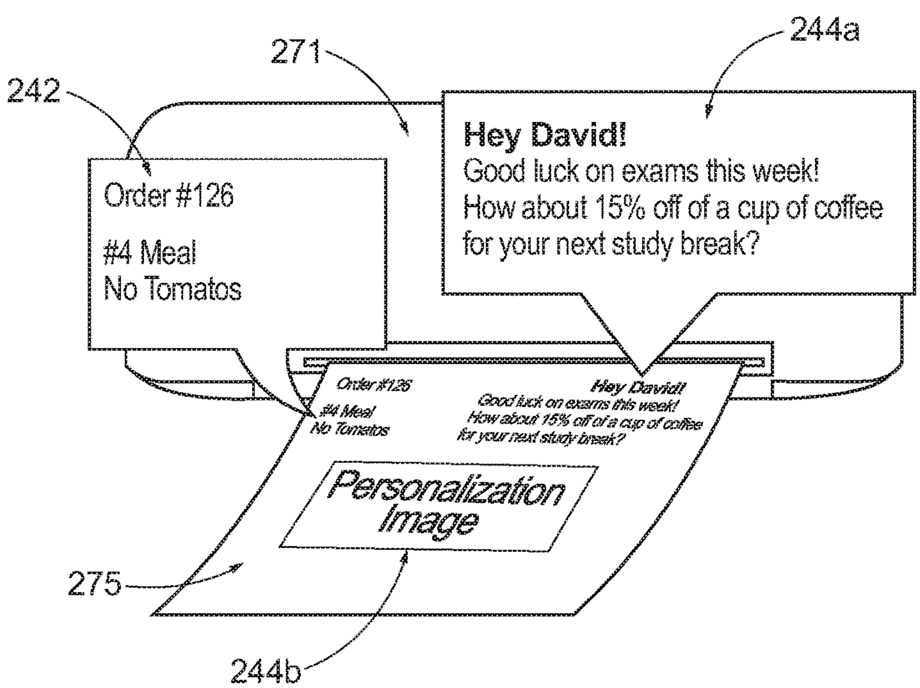
FIG. 3 illustrates example order print information and personalization print information for a food service material item, in accordance with some embodiments discussed herein.

In some embodiments, the food service material printing module 40 is configured to determine, based on the order information from the food request module 20, order print information to print on at least one food service material item. In some embodiments, the order print information includes at least the food order and one or more custom characteristics that are specific to the request for food service. For example, FIG. 3 shows an example dispenser/printer 271 that is configured to print on a food service material item (e.g., a food wrap 275). In the depicted embodiment, the food service material printing module 40 has determined the order print information 242 to include an order number ("Order #126"), an indication of the food order ("#4 Meal"), and a custom order characteristic ("No Tomatos").

In some embodiments, the order print information may include other order related information, such as ingredients and/or nutritional information. For example, the calorie count may be determined based on chosen ingredients and printed onto the food service material. In some such embodiments, the "basic", "common", or "advertised" make-up (e.g., ingredients) of the ordered food service item may form a base level calorie count. From there, the customization of the ingredients may be factored into the calorie count to produce a customized calorie count. In some embodiments, the base level calorie count and/or custom calorie count may be printed on the food service material for the consumer.

In some embodiments, the order print information may be designed to be presented to the customer with the food order. For example, the order print information (or a portion thereof) may be visible to the customer upon the customer receiving the food order. In such an example embodiment with the order print information printed on the food service material item, the customer may feel confident in the accuracy of their food order.

Figure 4A:
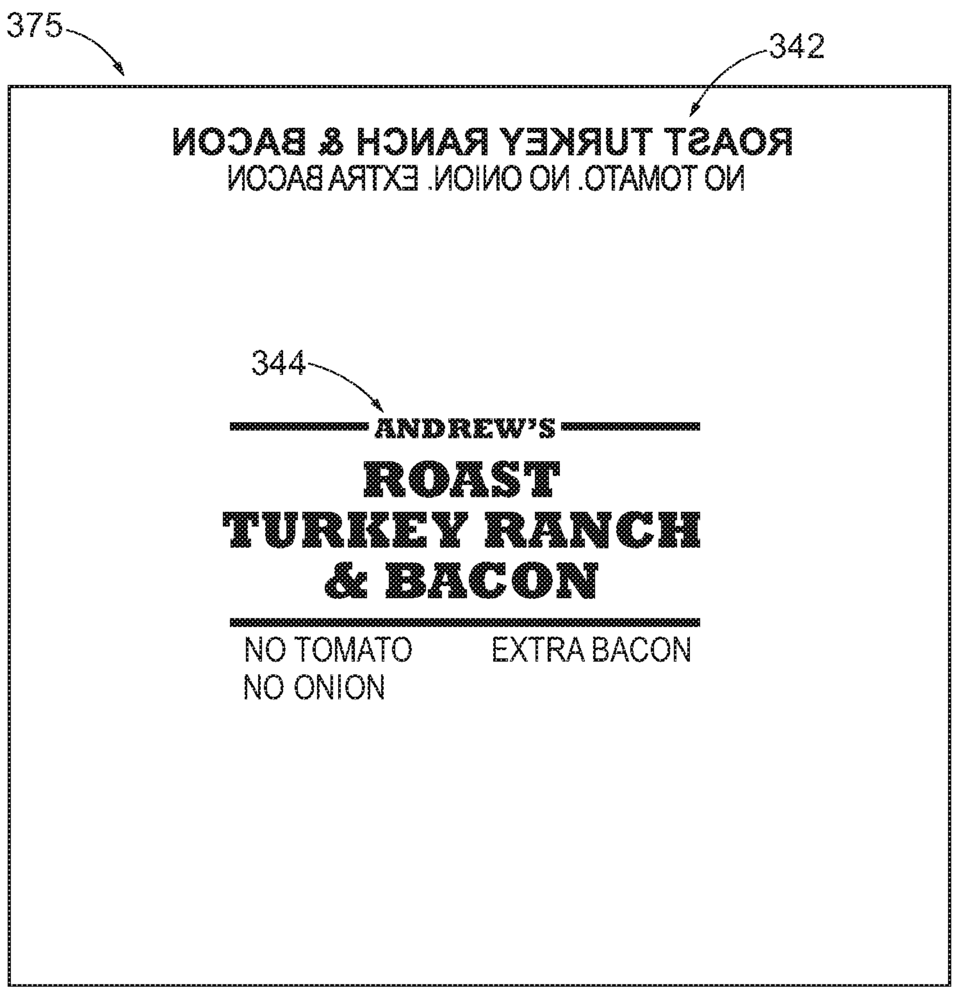
FIGS. 4A-4E illustrate example order print information and/or personalization print information for a food service material item, in accordance with some embodiments discussed herein.
Figure 4B:
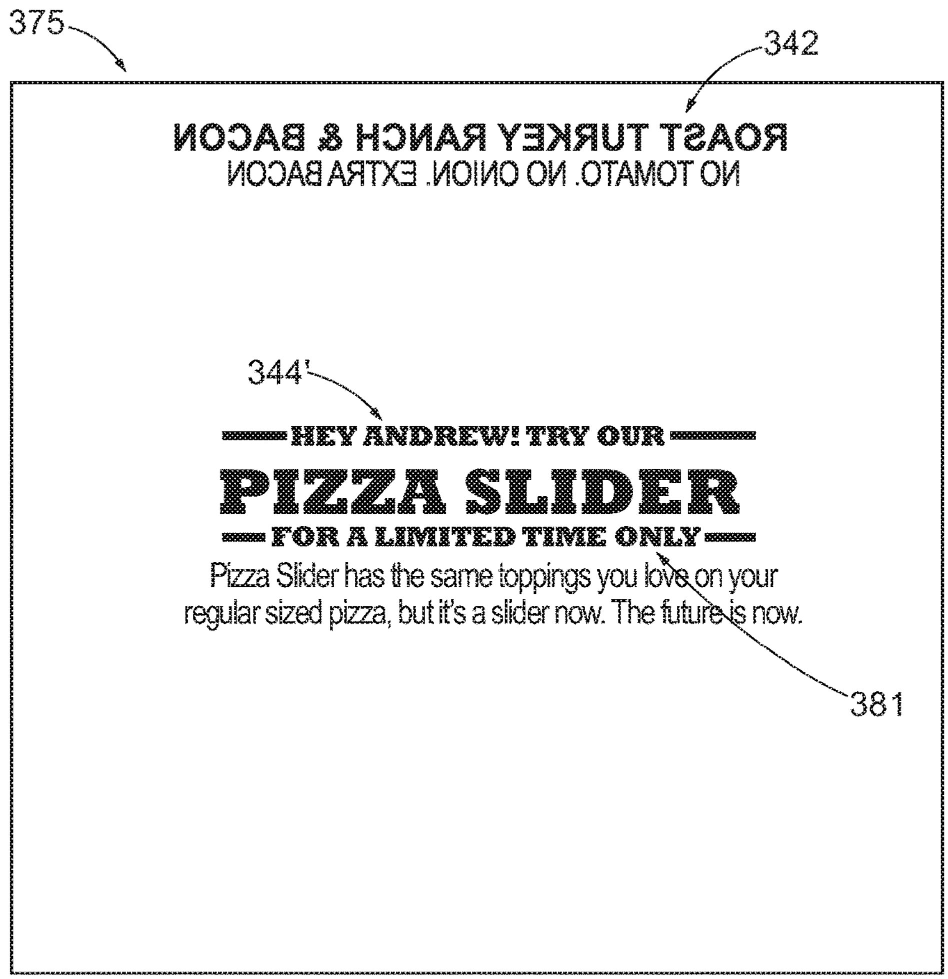
Figure 4C:
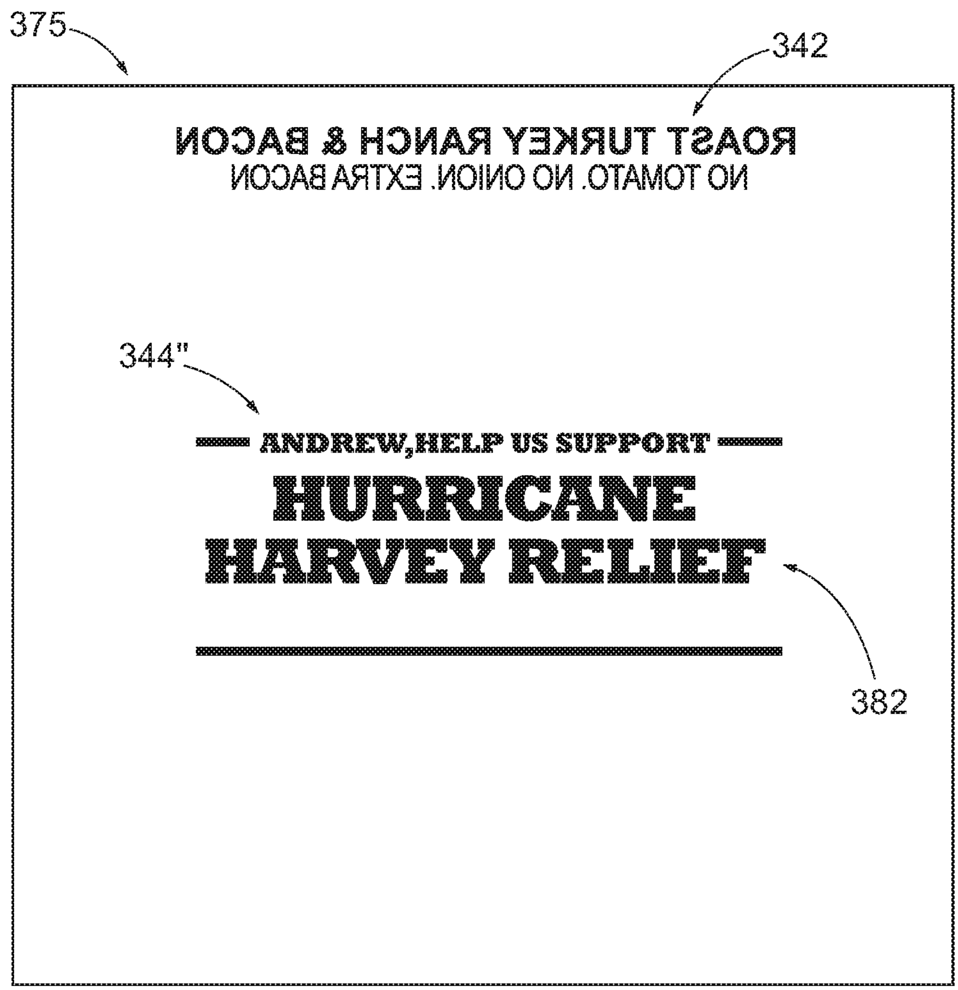
Figure 4D:
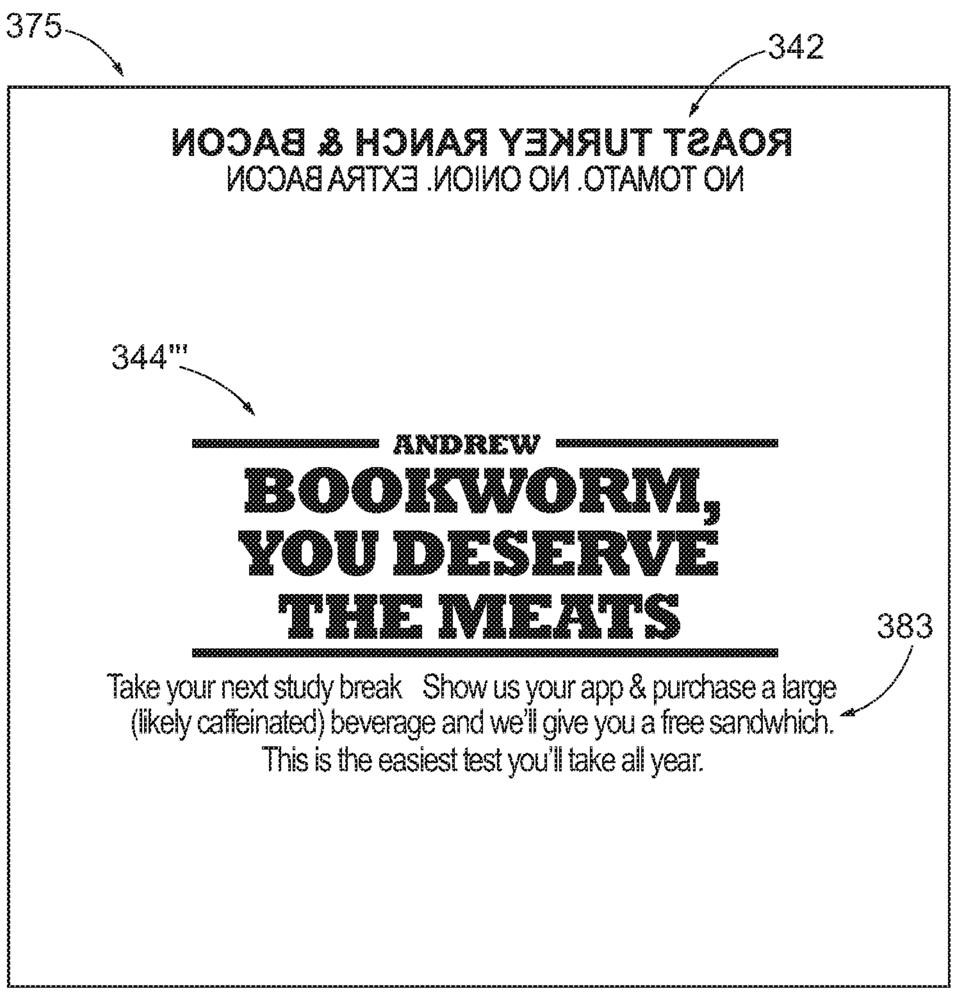
Figure 4E:
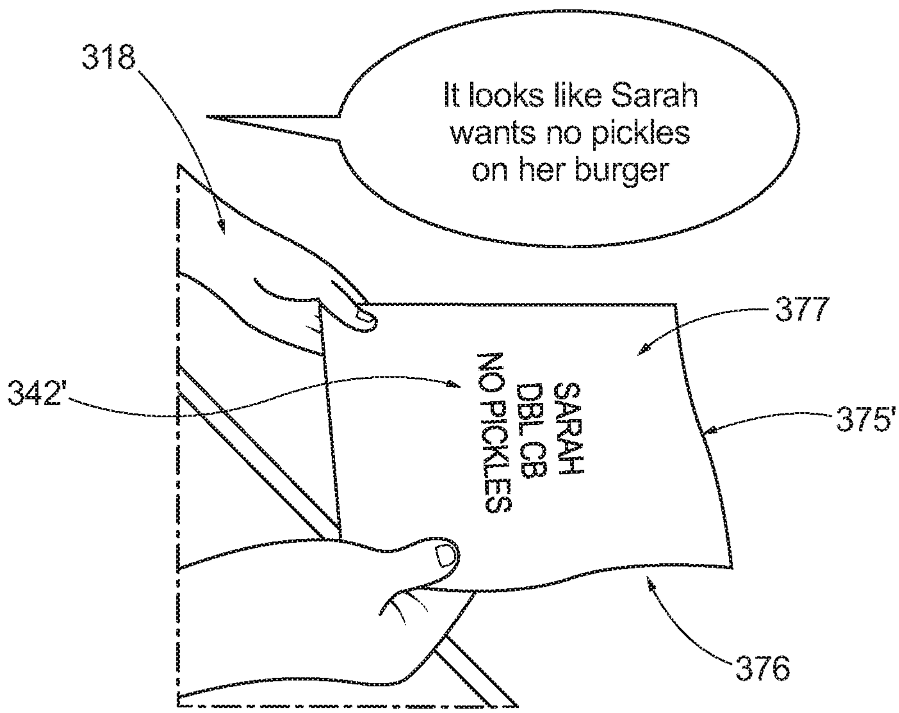

Additionally or alternatively, in some embodiments, one or more food service people may use the order print information during assembly of food order, thereby increasing accuracy of the food order. In this regard, in some embodiments, the order print information may be printed on the food service material item in a position or orientation such that it can be utilized during assembly of the food order by the food service person. For example, in some embodiments, the order print information may be printed in a backwards direction (e.g., the letters are backwards) such that a food service person can read the order print information when the food service material item is flipped over. For example, FIGS. 4A-4D illustrate example food service material items 375 (e.g., food wrap sheets for a hamburger) that have order print information 342 printed on an outer surface (e.g., a surface designed to face the customer after assembly). As such, the food service person may flip the food service material item 375 over to start assembling the food order thereon (e.g., on the inner surface). In some embodiments, the order print information 342 ("ROAST TURKEY RANCH & BACON NO TOMATO, NO ONION, EXTRA BACON") is visible with the letters in the proper reading direction with the food service material item flipped over. For example, the food service material item may be at least partially translucent. Further, with being positioned near an edge of the food service material item, the order print information 342 may remain visible while the food order is being assembled in the center. FIG. 4E provides another example, wherein the order print information 342' is printed on the inside surface such that the food service person 318 can read the order print information during assembly of the food order. Such example embodiments may help ensure order accuracy, as a food service person may not need to constantly look back and forth between a monitor and the food order.

In some embodiments, the food service material printing module 40 may determine other example instructions for a food service person. For example, arrows or other order preparation instructions may be printed on the food service material to help a food service person complete an order. In some embodiments, a desired direction/orientation of the printed food service material item during order preparation may be taken into account such that the arrows/instructions show a food service person where to begin wrapping and/or unfolding (if the food service material item is pre-folded).

In some embodiments, the food service material printing module 40 may determine any form of communication to utilize for the order print information. For example, while example text is shown in FIGS. 4A-4E, other forms of communication are contemplated, such as icons with "X"s through them (e.g., an "X" through an image of a tomato), images, etc.

Similarly, in some embodiments, only positive ingredients may be printed on the food service material (e.g., only ingredients that the food service operator will need to add to complete the order). Such an example may help ensure the proper ingredients are utilized, not needing to rely on the memory of the food service operator.

In some embodiments, the food service material printing module 40 is configured to determine, based on the personalization information from the order personalization module 30, personalization print information to print on at least one food service material item. In some embodiments, the personalization print information includes personalization information and/or advertisement information. For example, FIG. 3 shows an example dispenser 271 that is configured to print on a food service material item (e.g., a food wrap 275). In the depicted embodiment, the food service material printing module 40 has determined the personalization print information 244*a* to include a greeting with the customer's name ("Hey David!"), a personalize message ("Good luck on exams this week!"), and an advertisement/promotion ("How about 15% off of a cup of coffee for your next study break"). Additionally, the food service material printing module 40 has determined the personalization print information 244*b* to include an image, such as may be any image including, for example, a logo from a favorite or local sports team, college, etc., a picture from the camera roll of the customer, or other image. Although shown as "David" in the above example, in some embodiments, the customer's name may be any identifier for the customer, e.g., their name, their nickname, their first name, an avatar, a screen name, a user id, etc.

In this regard, in some embodiments, the personalization print information may be any suitable image, text, icon, etc. It may be related to the customer, the store, the location, or any other personalization feature. FIGS. 4A-4D illustrate example food service material items 375 (e.g., food wrap sheets for a hamburger) that have personalization print information printed on an outer surface (e.g., a surface designed to face the customer after assembly). For example, FIG. 4A shows personalization print information 344 that includes the customer name in relation to order information. FIG. 4B shows personalization print information 344' that includes the customer name in relation to a limited time offer (LTO) 381. FIG. 4C shows personalization print information 344" that includes the customer name in relation to an advertisement/service announcement/request for charity assistance 382. FIG. 4D shows personalization print information 344'" that includes the customer name in relation to a promotion offer 383.

In some embodiments, the food service material item for printing may include pre-printed information. In such example embodiments, the order print information and/or personalization print information may be printed on the food service material item with the pre-printed information. In some such embodiments, the order print information and/or personalization print information may need to account for such pre-printed information such as in content and/or positioning on the food service material item.

In some embodiments, the personalization print information may be determined based on any number of factors. For example, the personalization print information may be determined to include one or more targeted messages and/or advertisements based on past habits (e.g., order history, time of orders, etc.) or projected habits of the customer. Additionally or alternatively, the food service business may wish to "push" or promote certain products or time windows for customers, which may be considered in determination of the personalization print information. Other possible factors include, for example, related/sister businesses (e.g., cross marketing), limited time offers, promotional offers, products or time windows for that store and/or corresponding location (e.g., region), preferences of the customer, etc. For example, the food service business may want to promote cheeseburgers in the region, because barbeque sandwiches are currently popular at that location.

In some embodiments, the personalization print information and/or order print information may be determined to be printed in a preferred language of the customer. In some embodiments, the preferred language may be determined from the personalization information. In some embodiments, the preferred language may be determined based on the location of the store in which the food order was requested. Similarly, in some embodiments, the personalization print information and/or order print information may be determined to be printed in brail, such as to accommodate the customer. For example, divots, imprints, or other features may be employed by the printer to manipulate the food service material item to product brail. In some embodiments, the determination to use brail may be based on the personalization information regarding the customer.

Figure 5A:
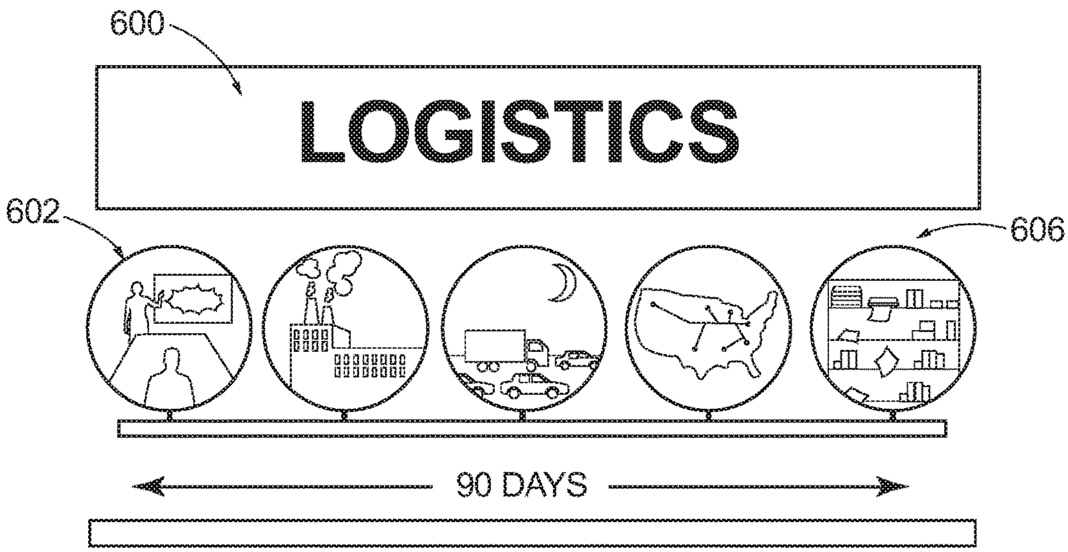
FIG. 5A illustrates a common logistics flow from creation of a promotion to supplying a store with promotional material.
Figure 5B:
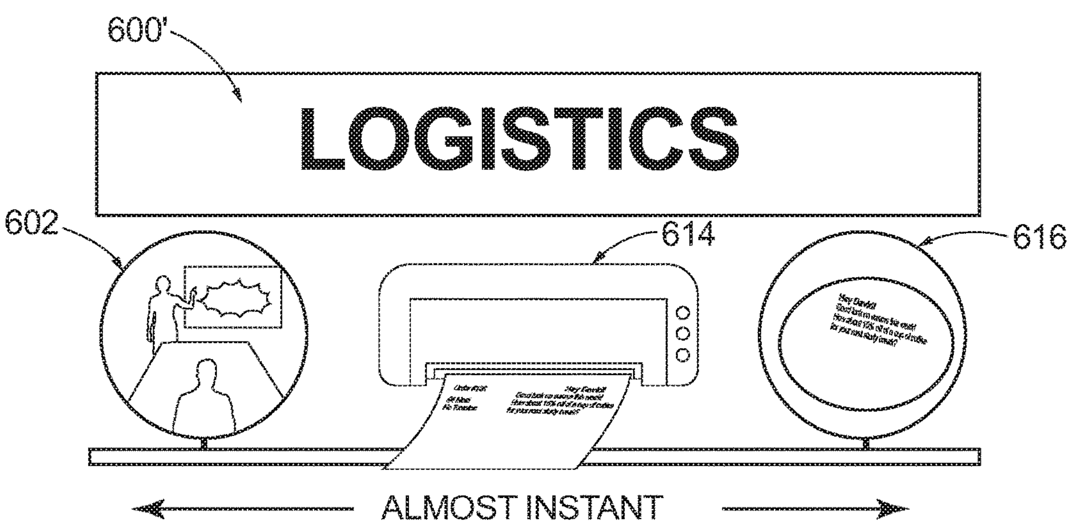
FIG. 5B illustrates an example logistics flow from creation of a promotion to packaging a food order using an example on-demand food service material printing system, in accordance with example embodiments described herein.

In some embodiments, the personalization print information may be determined in real-time, such as while the food service request is being processed. In this regard, updated information can be utilized at the time the food service request is being placed. This allows current information to be utilized in determining what to print on the food service material item. For example, the food service business may have just come up with a new promotion. Once the system is updated with the available new promotion, it can be used by the on-demand food service material printing system 10. This avoids the previous long logistics time frame it took from a decision to implement a new promotion to available food service material with the new promotion. Instead, the update may be instantaneous. For example, FIG. 5A illustrates a common prior logistics flow 600 from creation of a promotion 602 to supplying a store with promotional material 606. That logistics flow would often take at least 90 days. FIG. 5B, however, illustrates an example logistics flow 600' according to various example on-demand food service material printing systems. That logistics flow 600' is almost instant from creation of a promotion 602 to availability of personalization print information for printing on the food service material item at 614 and for providing to the customer at 616.

In some embodiments, the control architecture 15 may include an advertisement module configured to determine one or more advertisements (e.g., a promotion, limited time offer, etc.) to print on the food service material item. In some embodiments, the advertisement module may work in conjunction with or replace portions of the food service material printing module 40.

In some embodiments, the control architecture 15, such as through the predictive data analytics module 50 and/or food service material printing module 40, may be configured to determine one or more messages and/or advertisements to provide to the customer based on the personalization information. In some embodiments, the predictive analytics module 50 and/or food service material printing module 40 may take into account gathered order information and/or personalization information from a plurality of food order requests. Such considered order and/or personalization information may be bounded/limited according to a time threshold (e.g., between 11 am-3 pm, within the last 30 days, etc.) and/or location threshold (e.g., just this store, stores within 25 miles, etc.).

In some embodiments, the predictive data analytics module 50 and/or food service material printing module 40 may be configured to determine a message to provide based on a determined product, time window, promotion, limited-time-offer, etc. For example, the food service business may determine that they wish to "push" customer traffic in the store after 5 pm. The predictive data analytics module 50 and/or food service material printing module 40 may determine, such as based on the customer history, that the customer that just placed an order usually orders chicken strips between 11 am-3 pm. Additionally, the predictive data analytics module 50 and/or food service material printing module 40 may determine that the food service business wants to drive in customers after 5 pm. In such a situation, the predictive data analytics module 50 and/or food service material printing module 40 may determine a message that provides a promotional offer for chicken strips, but only after 5 pm—thereby personalizing the offer to the customer (as the customer normally orders chicken strips), but incentivizing the customer to come to the store for dinner (e.g., after 5 pm per the food service business' wishes). In response, the predictive data analytics module 50 and/or food service material printing module 40 may provide the determined message to the control architecture 15, other modules, and/or other systems/devices (e.g., one or more dispenser(s)/printer(s) 70) to have the determined message printed on the food service material item for presentation to the customer with their food order.

In some embodiments, the predictive data analytics module 50 and/or food service material printing module 40 may be configured to determine a message to provide from among a plurality of messages. Such a determination may be based on a prediction of what type of message may drive a desired output from the customer. For example, certain products, time windows, promotions, or limited-time-offers may be associated with a set of available messages for driving customer action. Each of the messages in the set may approach that goal differently. For example, a first message (message 1) may provide a percentage off the product as an incentive; a second message (message 2) may offer a percentage off a related product that is often purchased with the product; or a third message (message 3) may offer extra loyalty reward points for purchasing the product. In some embodiments, the predictive data analytics module 50 and/or food service material printing module 40 may be configured to determine which of the messages to use for the specific customer that just placed an order based on personalization information and/or order information. For example, if the customer is close to reaching a threshold for their loyalty reward points, the predictive data analytics module 50 and/or food service material printing module 40 may determine that message 3 should be used to attempt to drive the customer to purchase the product (and reach a desirable loyalty reward point threshold). In response, the predictive data analytics module 50 and/or food service material printing module 40 may provide the determined message to the control architecture 15, other modules, and/or other systems/devices (e.g., one or more dispenser(s)/printer(s) 70) to have the determined message printed on the food service material item for presentation to the customer with their food order.

In some embodiments, the predictive data analytics module 50 may be configured to determine one or more messages to provide to a third-party based on a plurality of requests for food service. For example, the predictive data analytics module 50 may consider a plurality of requests for food service during a specific time period and/or for a specific location/region and determine that a delivery service may likely require certain packaging needs (e.g., a certain number of heaters, bags, etc.). The predictive data analytics module 50 may be configured to send that information to the third party.

In some embodiments, the predictive data analytics module 50 and/or food service material printing module 40 may be configured to determine print information (e.g., personalization print information) that includes game features, such as game pieces. For example, the game pieces could be determined and printed on-demand, thereby removing such game pieces from inventory storage and limiting lost pieces/winning potential. This may also enable tracking of "winning" pieces, such as being able to link the winning game piece with a customer—since the customer that purchased the winning piece may be determined from the request for food service.

In some embodiments, the predictive data analytics module 50 and/or food service material printing module 40 may be configured to determine print information (e.g., personalization print information) that can be recognized by a user's device (e.g., through image recognition and/or computer readable marker detection such as quick response codes). In such example embodiments, an image and/or message may be printed on the food service material item and a customer may utilize their mobile device to interact with the printed information, such as by using a camera to perform image recognition of the printed image and/or message. In response, an application and/or message may be downloaded to and/or presented on their mobile device based on recognition of the printed image and/or message. The printed image and/or message may be determined based on personalization information such that it is targeted toward the customer.

In some embodiments, the predictive data analytics module 50 and/or food service material printing module 40 may be configured to determine print information (e.g., personalization print information) based on the location of the customer and/or store. For example, one or more messages could be determined to target a nearby promotion, event, store, etc. In such a regard, the location of the customer at the time of the request and/or the location of the store for picking up the food order may be utilized in determination of the print information.

In some embodiments, the system may be configured to enable printing of information related to storage or other functions that may be useful for the store. For example, the system may be configured to enable printing on food service material items that may be used by the store, such as for storage. In such a regard, the printer may be configured to print relevant storage data, such as a package date, what food item is being stored, a use by date, etc.

In some embodiments, the system may be configured to enable reprinting of the food service material item, such as if an error occurred or the food service material item was accidently dropped on the floor. In some such embodiments, an operator may request the "last" print job, a certain order number, or other identifier to cause the relevant food service material item to be reprinted. In some such embodiments, the printer may be configured to receive voice commands, such as to enable reprinting. For example, a food service person may say "Printer, reprint the last order" or "Reprint Order 271". In response, the printer may reprint the appropriate printed information on a new food service material item.

Example Printing and Printers

Figure 6:
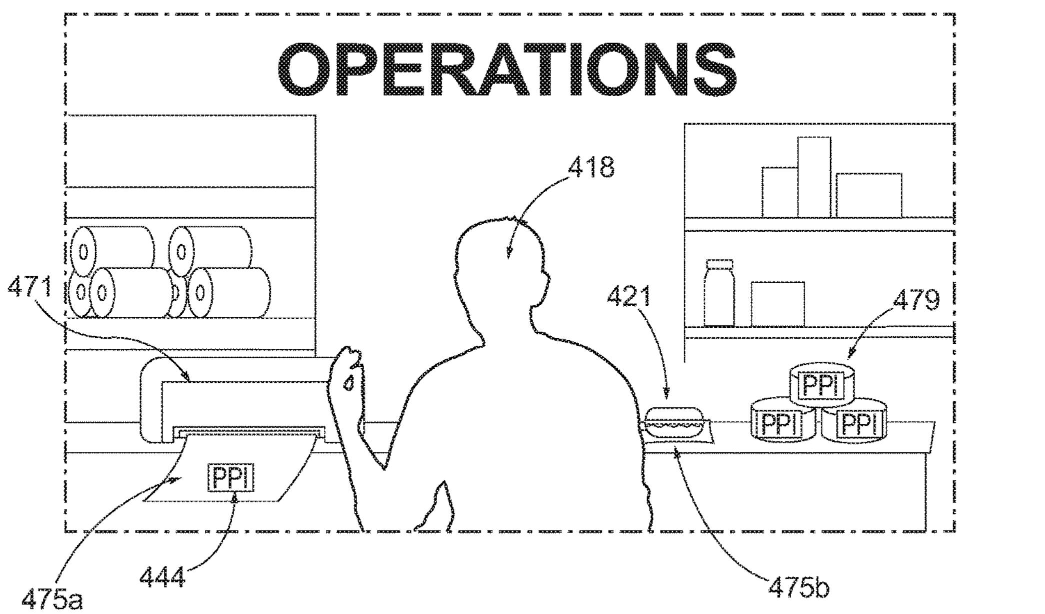
FIG. 6 illustrates example on-demand printing on a food service material item and packaging of a food order, in accordance with some embodiments discussed herein.

FIG. 6 illustrates example on-demand printing on a food service material item and packaging of a food order. In the depicted embodiment, a dispenser/printer 471 has printed and dispensed a food service material item 475*a* (e.g., a food wrap for a hamburger). The food service material item 475*a* includes personalization print information 444 and order print information (not shown), such as described herein. The food service person 418 is able to retrieve the printed food service material item 475*a* and (as shown with respect to a second printed food service material item 475*b*) wrap the food order (e.g., the hamburger 421) for the food service request. The result is a packaged food order 479 with personalization print information and/or order information printed and presented to the customer with their food order.

Though the above described example details an example printed food service material item of food wrap, many different food service material items are contemplated for such on-demand printing with example systems described herein. In such a regard, depending on the available or desired food service material item, the one or more printer(s) 70 may be configured to enable printing thereon (e.g., utilize the proper ink for the material, store the desired material for the food service material item, etc.).

Some example contemplated food service material items include a food wrap (e.g., paper, foil, partially translucent paper, etc.) for wrapping the food order, a pouch for at least partially containing or covering the food order, a container for at least partially containing or covering the food order, a cup for holding or at least partially containing the food order, a tray liner for use with the food order, a bag (e.g., in store bag, carry out bag, etc.) for at least partially containing the food order, or a napkin for use with the food order. In some embodiments, the food service material item may be one or more food packages that are configured to at least partially cover or contain the food order. Example food packages may include, at least, food wrap for wrapping the food order, container(s) for at least partially containing or covering the food order, a cup for holding or at least partially containing the food order, a pouch for at least partially containing or covering the food order, a bag for at least partially containing the food order, among others.

Figure 7:
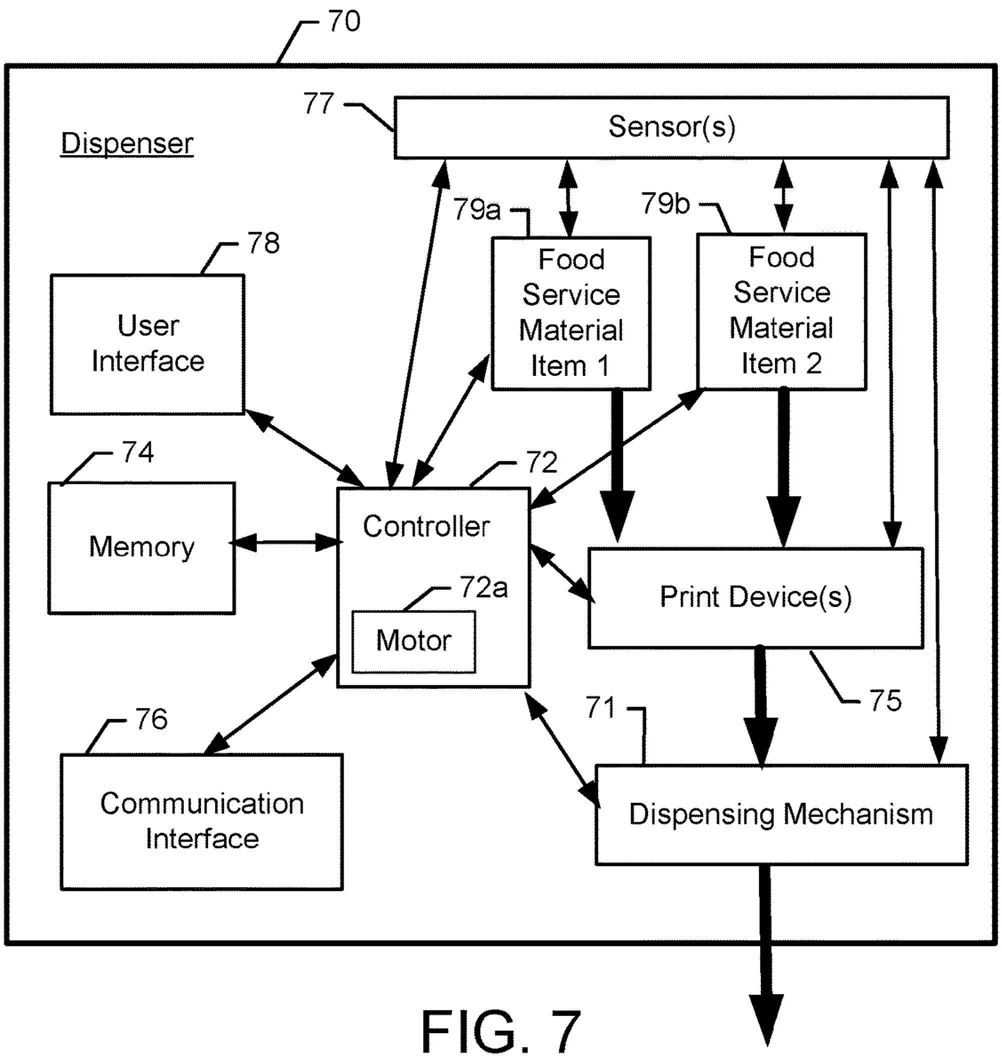

With reference to FIG. 7, an example dispenser (e.g., printer) 70 may comprise hardware and/or software capable of performing functions described herein. In this regard, the dispenser 70 may include a controller 72, a motor 72*a*, a memory 74, a communication interface 76, a user interface 78, one or more food service material item supplies 79*a*, 79*b*, one or more print devices 75, one or more dispensing mechanisms 71, and one or more sensor(s) 77.

The controller 72 may be any means configured to execute various programmed operations or instructions stored in a memory device such as a device or circuitry operating in accordance with software or otherwise embodied in hardware or a combination of hardware and software, thereby configuring the device or circuitry to perform the corresponding functions of the controller 72 as described herein. In this regard, the controller 72 may be configured to receive one or more instructions for printing, such as through the communication interface 76. In some embodiments, the controller 72 may configured to determine, process, and/or choose the determined food service material item from among a plurality of available food service material items (e.g., either a first food service material item from supply 79*a* or a second food service material items from supply 79*b*). In some embodiments, the controller 72 may configured to cause printing on one or more food service material items (such as through the print device(s) 75). In some embodiments, the controller 72 is configured to cause dispensing of the printed food service material item, such as using the dispensing mechanism 71. In some embodiments, the controller 72 may cause monitoring, such as through sensor(s) 77, of supply materials of the printer (such as ink for the print devices 75 and/or food service material item from the supplies 79*a*, 79*b*). The controller 72 may also be configured to send gathered information and/or instructions to other devices, systems, or modules to perform various functions described herein. In some embodiments, the controller 72 may be configured to operate according to one or more modules described herein. For example, in some embodiments, the controller 72 may be configured to operate according to the control architecture 15, such as the food service material printing module 40.

One or more motors 72*a* may be used to operate various features/components of the dispenser 70. In some embodiments, the controller 72 may be configured to operate the motor 72*a* accordingly. For example, one or more motors 72*a* may be used to drive one or more rollers (or roll holders) to cause food service material to move through the dispenser 70, such as to interact with the print devices 75, dispensing mechanism 71, etc. In some embodiments, the controller 72 may be configured to control the motor 72*a* to cause dispensing of a food service material item, such as a sheet of food service material of a specific size.

The one or more food service material item supplies 79*a*, 79*b* may be configured to hold and/or store one or more food service material item supplies. For example, the dispenser 70, depending on the configuration, may be configured to hold various supplies, such as rolls of food service material, sheets of food service material, stacks of food service material items, etc. In the depicted embodiment, the dispenser 70 includes two supplies 79*a*, 79*b*. In some embodiments, the supplies 79*a*, 79*b* may hold the same type of food service material item (e.g., both may hold a same food wrap). In such a situation, the dispenser 70 may be enabled to switch to dispensing and printing from a primary supply to a secondary supply when the primary supply is depleted. In some embodiments, the supplies 79*a*, 79*b* may hold different types of food service material items (e.g., two different types of the same material, two different materials, such as two different types of food wrap, or two different types of material items, such as a food wrap and a container, among other possibilities). In some embodiments with two different types of the same material, the material for each may have different material characteristics, such as composition, weight, dimensions, etc. In some such embodiments, the dispenser 70 may be configured to choose which supply to use for printing and dispensing. In some embodiments, the food service material printing module 40 may be configured to determine which type of food service material item to print on, and instruct the dispenser 70 accordingly.

The one or more print devices 75 may be configured to print on one or more food service material items, such as from one of the supplies 79*a*, 79*b*. In some embodiments, the print device 75 includes ink that enables the printing, such as provided from one or more ink cartridges, tanks, reservoirs, etc. In some embodiments, the print devices 75 and/or dispenser 70 may be configured such that only proprietary ink cartridges may be utilized with the dispenser 70 (e.g., non-proprietary ink cartridges may be locked out). The ink may be specially configured based on the food service material item, desired print quality, or other factors (e.g., safety, durability, etc.). In some embodiments, the print device(s) 75 may be configured to utilize different print characteristics for different types of food material items (e.g., different types of the same material, different materials, such as different types of food wrap, or different types of material items, such as a food wrap and a container, among other possibilities). For example, depending on which food service material item is selected for printing (such as from among two options), the print device(s) 75 may be configured to employ different print characteristics, such as different ink, different settings, different components (e.g., rollers and/or presses), etc.

In some embodiments, the print devices 75 are configured to print the order print information and the personalization print information on the food service material item(s). In some embodiments, the print devices 75 may include rollers, presses, or other hardware necessary for performing the printing. In some embodiments, the print devices 75 may be configured to print on multiple surfaces of the food service material item. For example, the print device 75 may be configured to print order print information on a first surface and personalization print information on a second, opposite surface.

The one or more dispensing mechanisms 71 may be configured to cause dispensing of printed food service material items. In some embodiments, the dispenser 70 may include rollers, transfer systems, or other hardware for effecting transfer of the food service material item through the components of the dispenser and out of the dispenser for the food service provider/person (e.g., along a path through the dispenser). In some embodiments, the dispenser 70 may include one or more chutes for guiding the food service material, such as toward a dispensing slot.

In some embodiments, the dispensing mechanism 71 may include one or more cutting arrangements (e.g., knives, tear bars, etc.) that are configured to cause or enable cutting of the printed food service material item, such as for dispensing. For example, the dispenser may include a cutting device configured to cut the food service material, and the dispenser may be configured to at least one of cut or enable removal of a portion of the roll of food service material to form a printed food service material sheet. The printed food service material sheet may include the order print information and/or the personalization print information. Further, the dispenser may be configured to dispense the printed food service material sheet for use. In some embodiments, there may be different cutting arrangement options depending on which food service material item is chosen for printing and dispensing.

In some embodiments, the dispensing mechanism 71 may be configured to cut a roll of food service material at a determined dimension (e.g., length and/or width) to cause a printed food service material sheet of a desired size (which may vary depending on the corresponding food order) to be available for dispensing. For example, the dispenser may include at least one knife configured to cut the roll of food service material, and the dispenser may be configured to cut the roll of food service material at one of a plurality of lengths or widths to form the printed food service material sheet such that the printed food service material sheet has dimensions that are specific to the food order.

In some embodiments, the dispensing mechanism 71 may comprise one or more tear bars that are positioned within the dispenser (such as proximate a dispensing chute) to enable an operator to utilize the tear bar to enable removal of the printed food service material sheet.

In some embodiments, the roll of food service material may include one or more sets of perforations (e.g., pre-cut perforations periodically positioned on the roll) to enable removal of the portion of the roll of food service material. In some such embodiments, the dispenser may be configured to print the desired print information on portions of the roll of food service material between sets of perforations, such as to enable removal of a printed sheet that includes the order print information and/or the personalization print information.

In some embodiments, the dispensing mechanism 71 may comprise one or more separator devices that are configured to separate the portion of the roll of food service material that includes the printed information. For example, the one or more separator devices may be configured to separate pre-cut/perforated portions of the roll of food service material.

The one or more sensor(s) 77 may be configured to monitor various components or supplies from the dispenser 70. For example, in some embodiments, the one or more sensors 77 may be configured to monitor the available ink for the print device(s) 75. In such embodiments, the controller 72, such as through one or more modules of the system 10 (e.g., the food service printing module 40), may determine when replacement ink is needed and, in some cases, perform automatic ordering thereof. Similarly, in some embodiments, the one or more sensors 77 may be configured to monitor the available food service material item supply, such as from supplies 79*a*, 79*b*. In such embodiments, the controller 72 may determine when replacement food service material items are needed and, in some cases, perform automatic ordering thereof. In some embodiments, the controller 72 may provide one or more messages/indications to be sent to the food service business indicating a need to supply more ink or food service material items for the dispenser 70.

The memory 74 may be configured to store instructions, computer program code, order data (e.g., order information), order print information, personalization information, personalization print information, and other data/information associated with the dispenser 70 in a non-transitory computer readable medium for use, such as by the controller 72.

The communication interface 76 may be configured to enable connection to external systems (e.g., an external network 12, one or more food request systems 80, one or more dispenser(s) 70, a customer's mobile device, a computer server, the control architecture 15, and/or one or more other system(s)/device(s)). In some embodiments, the communication interface 76 may comprise one or more transmitters configured to transmit, for example, one or more signals according to example embodiments described herein. Likewise, the communication interface 76 may include at least one receiver configured to, for example, receive data according to example embodiments described herein. In some embodiments, the transmitter and receiver may be combined as a transceiver. In this regard, the dispenser 70 may be configured for wired and/or wireless communication. In some embodiments, the communication interface 76 may comprise wireless capabilities for WiFi, Bluetooth, or other wireless protocols. In some embodiments, the dispenser 70 may be connected, such as through Bluetooth, to one or more food request/POS system(s) 80 such as to enable performance of various functions herein.

The user interface 78 may be configured to receive input from a user and/or provide output to a user. The user interface 78 may include, for example, a display, a keyboard, keypad, function keys, mouse, scrolling device, input/output ports, touch screen, or any other mechanism by which a user may interface with the system. Although the user interface 78 is shown as being directly connected to the controller 72 and within the dispenser 70, the user interface 78 could alternatively be remote from the controller 72 and/or dispenser 70. Likewise, in some embodiments, other components of the dispenser 70 could be remotely located.

As noted herein, various example embodiments may be utilized with different types of food service material items, such as food wrap, food containers, cups, carry-out bags, tray liners, napkins, pouches, among many others. In this regard, some example dispensers are designed to dispense and print on pre-folded food service material, such as pre-folded food wrap, pre-formed food bags, pre-formed food pouches, pre-formed food containers, etc. In some embodiments, the pre-folded wrap may form a "C" fold. A pre-folded food wrap may be useful for formation of the food service order (e.g., wrapping a burger). Another potential advantage of being configured to utilize pre-folded food wrap is a decrease in overall width needed for the dispenser and/or print devices. In this regard, the dispenser and/or print device may be kept to a desirable size (e.g., maintain a small footprint), such that it can be easily utilized/positioned in a food service line.

In some embodiments, the pre-folded food wrap may be used to form the food service material item after dispensing from the dispenser 70. For example, a food service person may glue and/or fold the pre-folded, printed wrap to form a food bag, container, pouch, etc. Alternatively, in some embodiments, the pre-folded food wrap may be unfolded, such as by the food service person or the dispenser to enable use thereafter.

Figure 7A:
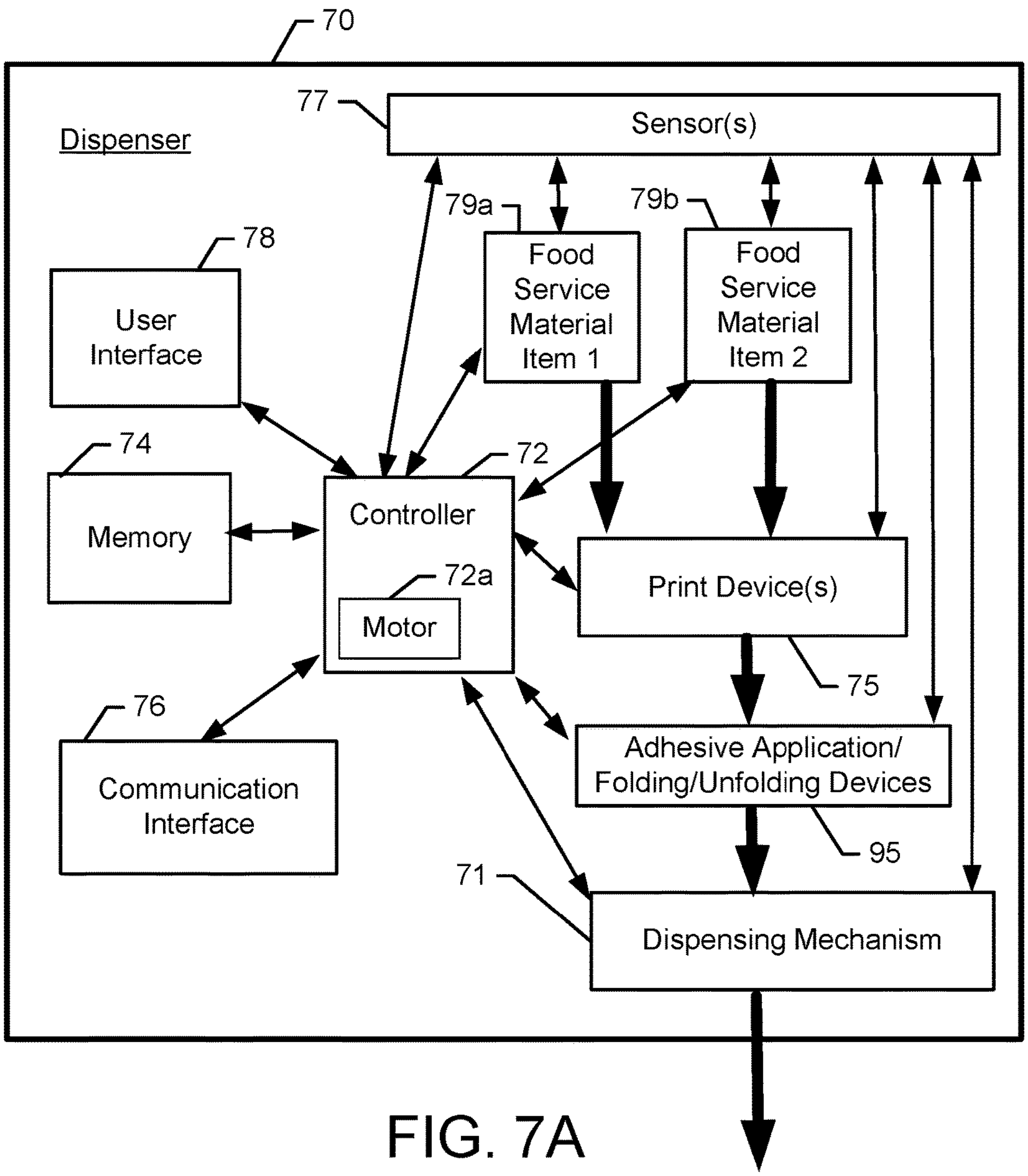
Figure 7B:
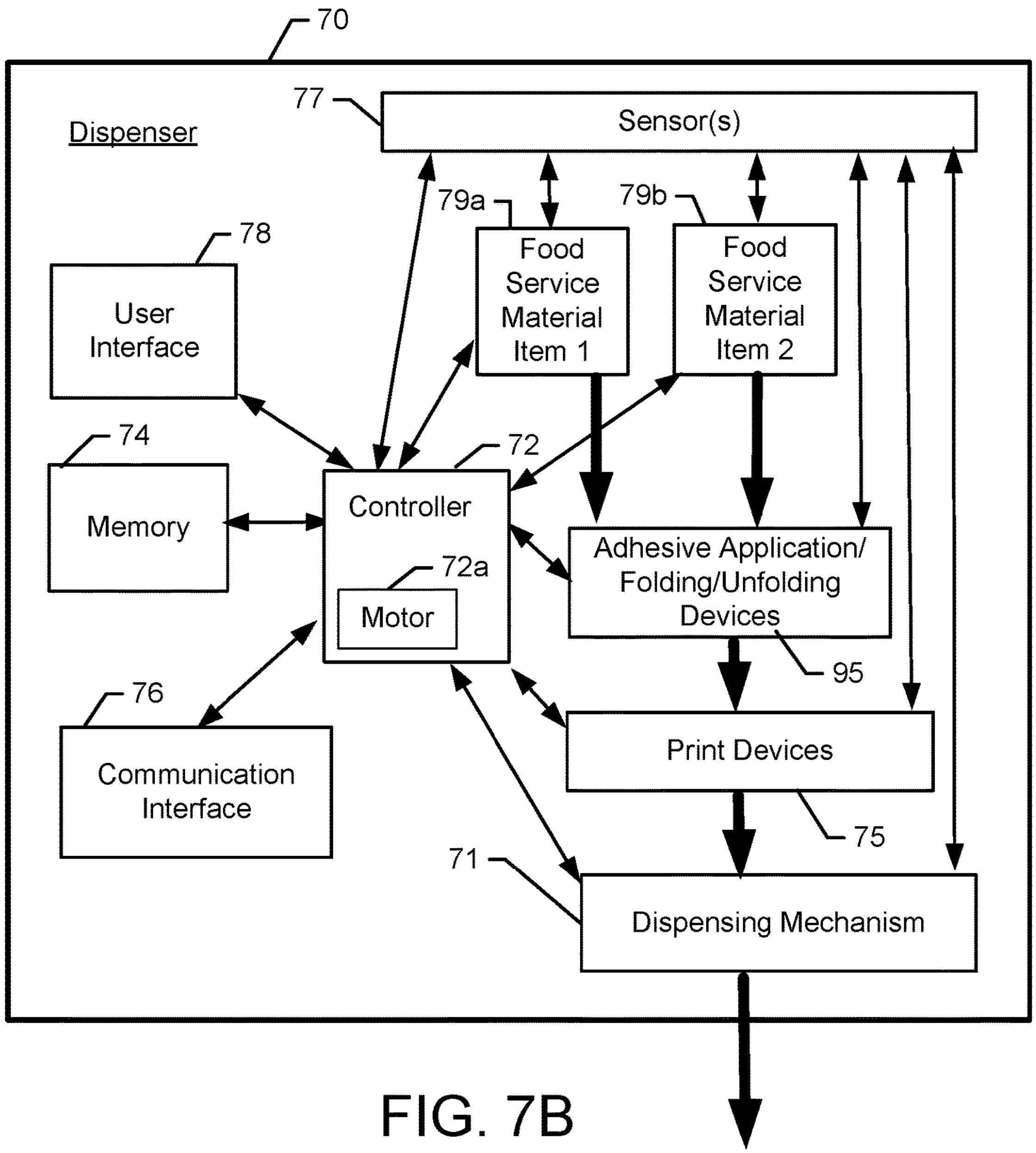

In some embodiments, the adhesive application, folding, and/or unfolding may occur within the dispenser 70, such as using an adhesive application device/folding and/or unfolding device 95. Such example dispensers 70 are shown in FIG. 7A (with the adhesive application/folding/unfolding device 95 downstream of the print device 75) and in FIG. 7B (with the adhesive application/folding/unfolding device 95 upstream of the print device 75). In some example embodiments, the adhesive application device may apply adhesive to specific sections of the sheet of food service material, such as using a roller, stamp, or other application device. In some example embodiments, the folding device may utilize one or more folding structures, such as rollers, stamps, or other suitable devices, to cause folding and pressure to be applied at appropriate sections of the sheet of food service material (e.g., in conjunction with the adhesive) to cause formation of a food service material item, such as a food bag, food pouch, food container, etc. In some embodiments, the unfolding device may utilize one or more unfolding structures, such as bars, presses, rails, counteracting crease structures, etc., to cause at least a portion of the folded food service material to become unfolded (or less folded).

In some embodiments, various combinations of the above noted adhesive application devices, folding devices, and unfolding devices may be present in the dispenser. In some embodiments, different paths could be provided that enable variation in how the food service material is processed through the dispenser 70. For example, certain food service material items may be glued at the adhesive application device (e.g., and/or folded or unfolded prior thereto), while other certain food service material may be processed only through a folding device or unfolding device prior to dispensing.

Figure 7C:
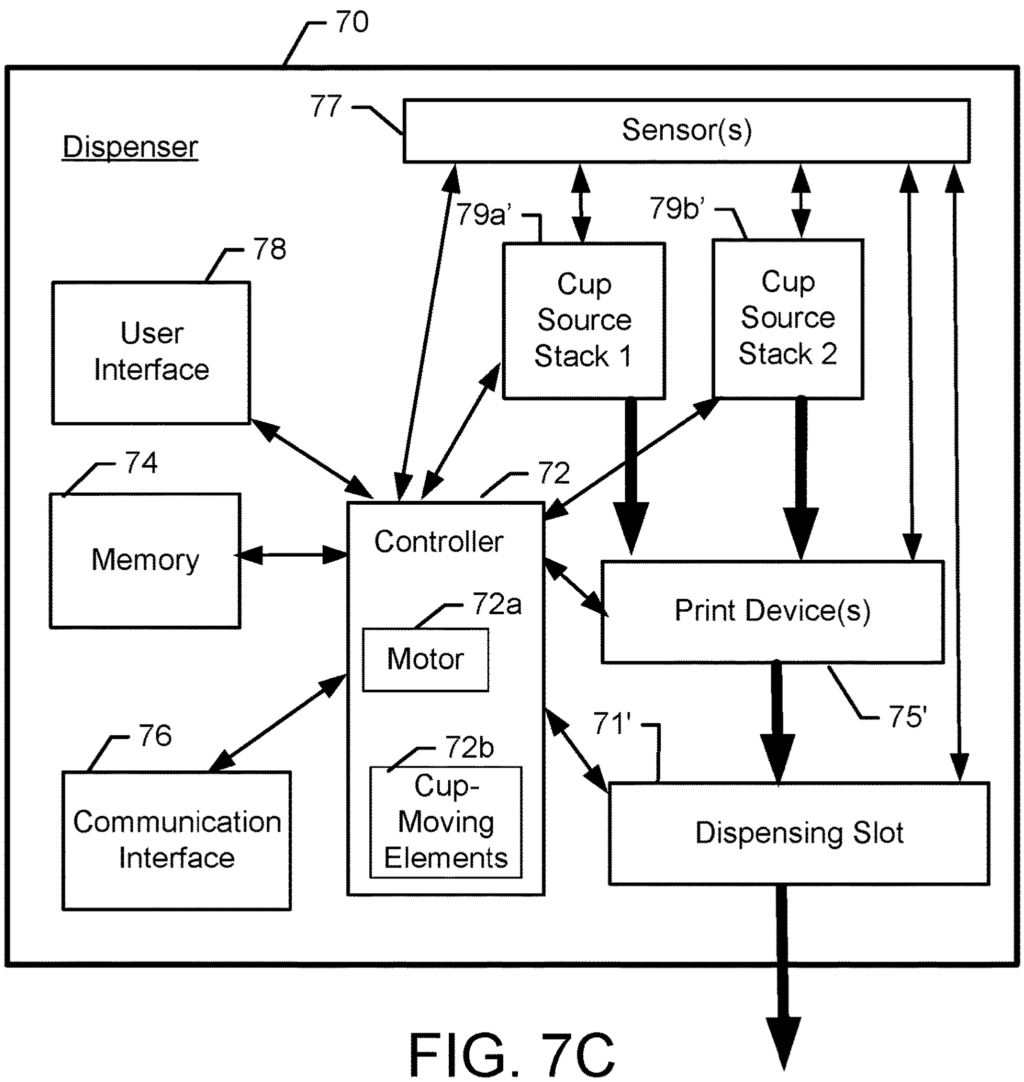

FIG. 7C illustrates another example dispenser designed specifically for on-demand printing and dispensing of cups for use in a food service order. While the depicted dispenser 70 includes a Cup Source Stack 1 79*a*' and Cup Source Stack 2 79*b*', other cup source options are contemplated, such as lines of cups, a single cup, etc. The depicted dispenser 70 also includes cup-moving elements 72*b*. In this regard, the dispenser 70 may include one or more structures/features that are configured to enable movement of the cup from the cup source through the dispenser 70 and its various components. Some example structures include a cup source removal structure for separating a single cup from the cup source, a cup movement structure for causing the cup to move from the cup source to a printing position for being printed on by the print device 75, a cup rotation structure for causing the cup to rotate for presentation of the printed cup to a food service provider.

FIG. 8A illustrates two example food service material dispensers for use with an example on-demand food service material printing system. In such a system, the system includes a first dispenser 471*a* that is configured to print on and dispense a first type of food service material item (e.g., a standard food wrap). The system also includes a second dispenser 471*b* that is configured to print on and dispense a second type of food service material item (e.g., a premium food wrap). In the depicted embodiment, the system has determined that the premium food wrap is need for the current food order and, thus, printed on and dispensed a printed premium food wrap sheet 475*c* using the second dispenser 471*b*. FIG. 8B shows a close-up view of the second dispenser 471*b*. The dispenser 471*b* includes a user interface 473 and a chute 472 for dispensing the printed food wrap sheet 475*c*. The chute 472 is designed to present the printed food wrap 475*c* for easy retrieval by a food service person 418. Though shown as separate dispensers (471*a*, 471*b*) for different food wraps in FIGS. 8A-8B, in some embodiments, a single dispenser may be configured to print on both types of food wraps.

FIG. 9 shows example food orders, where some of the food orders are packaged in a food service material with printed information thereon. For example, a hamburger 521 has been wrapped with a food wrap that has personalization print information 544*a* printed and oriented to face the customer upon presentation of their food order. In the depicted embodiment, the fries 522 are provided in a pouch that also has order print information (OPI) and/or personalization print information (PPI) 546 printed thereon. In some embodiments, the cup 523 may include printed information (such as personalization print information).

FIGS. 10A-10C show example dispensers that can be used with various example on-demand food service material printing systems described herein.

FIG. 10A shows an example dispenser 770 with a housing 774 that may be sized to maintain a small and/or desired footprint. In this regard, there may be limited space in the store and it may be desirable to position the on-demand printer near or within the food service preparation line (e.g., to allow the food service person to easily and quickly retrieve the printed food service material item for use in preparing the food order). In some embodiments, the system may be designed such that one or more dispenser 70 are positioned within a certain proximity of one or more food request systems 80. For example, the printer may be within 30 feet of at least one of a self-order kiosk or a point-of-sale operator terminal. Indeed, one benefit of the present system is to provide on-demand printing capability for food service material items for use during preparation of the food order and, thus, designing the printer to be positioned proximate the food order preparation area may be desirable to maintain efficient food order preparation. In some embodiments, due to the close proximity of the food request system and printer, Bluetooth communication between the two devices/systems could be utilized.

Returning to FIG. 10A, the dispenser 770 includes a housing 774 that is configured to hold at least one supply of food service material 778 (e.g., the shown roll of food service material) among other components (e.g., print devices 75). The dispenser 770 may also include a chute 772 for dispensing of printed food service material item. Additionally, the dispenser 770 may be designed to enable access (such as near 777) to the internal housing for maintenance, replacement of ink or food service material item supply, etc.

FIG. 10B shows another example dispenser 770' that includes a housing 774' that is configured to hold at least one supply of food service material (e.g., the housing may be configured to hold a stack of food service material sheets, such as near 779 within the housing) among other components (e.g., print devices 75). The dispenser 770' may also include a chute 772' for dispensing of printed food service material item. Additionally, the dispenser 770' may be designed to enable access (such as near 777') to the internal housing for maintenance, replacement of ink or food service material item supply, etc.

FIG. 10C shows another example dispenser 770" that includes a housing 774" that is configured to hold two rolls of food service material 778*a*, 778*b* among other components (e.g., print devices 75). The dispenser 770" may also include a chute 772" for dispensing of printed food service material item. Additionally, the dispenser 770" may be designed to enable access (such as near 777") to the internal housing for maintenance, replacement of ink or food service material item supply, etc.

FIG. 11 shows another example dispenser 1070 for printing on and dispensing a sheet of food service material (e.g., food wrap). The dispenser 1070 includes a housing 1074 that is sized to fit in a food service line. The housing 1074 includes a front cover 1074*a* that can be opened to enable access to the roll of food service material 1078 (shown in FIG. 11A), such as to enable replacement of a depleted (or near depleted) roll of food service material 1078. The housing 1074 also includes a side panel 1074*b* that can be removed and/or opened to enable access to various components of the dispenser 1070, such as for maintenance or replacement of parts or features. For example, the dispenser 1070 may be designed to enable replacement of ink for the print devices (e.g., print device 1075 shown in FIG. 11B).

The dispenser 1070 includes a user interface 1079 that can be used to display information to the food service provider and/or enable functionality, such as through button(s) and/or touchscreen(s). For example, the user interface 1079 may display the current food service material item that is being prepared by the dispenser. Additionally, the user interface 1079 may provide maintenance information to a nearby food service provider, such as if the ink needs replacement, if the roll of food service material is nearly depleted, error messages, etc. In some embodiments, such information may (additionally or alternatively) be provided through wireless or wired communications with a remote computing device.

The dispenser 1070 also includes a dispensing slot that enables a food service provider to collect a printed food service material item (e.g., a printed and appropriately-sized sheet of food wrap).

As illustrated with respect to FIG. 11A, a food service provider may open the front cover (not shown in FIG. 11A) to enable access to the roll of food service material 1078. In this regard, a depleted roll of food service material may be removed and replaced, such as by dropping a new roll of food service material into slots 1063 of the roll holder 1042 (see also FIG. 11B). The food service provider may then feed the leading edge of the roll of food service material into the dispenser 70 such as over an auto-tensioner roller 1095 and along arrow 1064 (shown in FIG. 11C). In some embodiments, an auto-feed feature may be provided that causes the motor to operate to assist in feeding the leading edge into the dispenser 70 so as to "prime" or prepare the dispenser 70 for future dispensing. In some embodiments, a food service provider may press button 1061 to initiate the auto-feed feature.

FIGS. 11B-11E illustrate a path 1011 for the food service material 1078 through the dispenser 70. In this regard, the food service material moves along the path 1011, such as due to rotation of one or more rollers 1031 and/or the roll holder 1042—which can be driven by operation of a motor (e.g., a motor 1043 may drive rotation of the roll holder 1042). For example, the food service material moves through a roll holder/cutting arrangement assembly 1040 positioned within the dispenser 1070. In particular, the food service material moves from the roll of food service material 1078 on a roll holder 1042 over an auto-tensioner roller 1095 and into the cutting arrangement 1045.

With reference to FIGS. 11C-E, the auto-tensioner 1095 comprises a rack and pinion assembly that enables adjustment of the tension in the food service material along the path 1011. In this regard, the controller (not shown) may monitor the tension in the food service material along the path 1011 and adjust it using the auto-tensioner 1095. In the depicted embodiment, the auto-tensioner roller 1095 is configured to translate within a slot 1098 along a rack 1099. Additionally, the auto-tensioner roller 1095 is connected to an arm 1096 that is pivotally connected to a spring 1097 at an opposite end. Such a configuration enables automatic tensioning adjustment to optimize the tension in the food service material along the path 1011 of the dispenser 1070. Notably, such optimized tension may be beneficial in maintaining optimal print and dispensing performance, as well as avoiding jamming or other potential errors.

In some embodiments, the controller (not shown) may monitor the tension in the food service material along the path 1011. For example, with reference to FIG. 11F, an auto-tensioner displacement sensor 1080 (e.g., a linear voltage displacement transducer) may measure the positions of the auto-tensioner roller 1095. In the depicted embodiment, the displacement sensor 1080 is connected to a translation linkage 1082 that translates with the auto-tensioner roller 1095. In response, the controller can measure the translation of the auto-tensioner roller 1095 to enable adjustments in the tension applied to the food service material along the path 1011 (such as through adjusting downstream rollers and/or various roller/motors along the path 1011). Although a linear voltage displacement transducer and translation linkage is shown in FIG. 11F, other sensors are contemplated.

In some embodiments, other dispensing arrangements for the food service material dispenser are contemplated. For example, instead of utilizing an auto-tensioner roller 1095, in some embodiments, a clutch mechanism and a reverse-curl bar may be utilized with a dispensing motor to cause food service material to be fed from a roll of food service material along the path 1011. FIGS. 12A-12D illustrate an example dispensing arrangement for various example food service material dispenser. In the depicted embodiment, a motor (not shown) drives the roll of food service material 1078 to cause dispensing of the food service material along the path 1011. A clutch mechanism 1250 is used to provide a drag force to help control the dispense and create desired tension. In some embodiments, the clutch mechanism 1250 may, along with a stationary guide bar 1295 (e.g., a stationary reverse curl bar), form a negative curl that helps de-curl the food service material that was rolled-up on a roll 1278.

With reference to FIG. 12B (which shows the dispensing arrangement with portions of the dispenser removed), the roll of food services material 1278 is held on a roll holder that rotates along an axis 1279. A first gear 1277 is positioned at the end of the roll holder and also rotates around axis 1279. The first gear 1277 is engaged with a second gear 1257 (shown in FIGS. 12C-D), that rotates about a second axis 1251.

The clutch mechanism 1250 includes a friction disk 1255 that rotates with the second gear 1257 about the second axis 1251 (such that the friction disk 1255 rotates with the roll of food service material 1278). The friction disk 1255 is sandwiched between two plates 1253*a* and 1253*b*, such as by utilizing fasteners 1252 (although other engagement and sandwiching means are contemplated). Notably, however, the plates 1253*a* and 1253*b* do not rotate with the friction disk and, instead, may be connected to the dispenser housing. Friction pads 1254*a* and 1254*b* may be attached to the plates 1253*a* and 1253*b*, respectively, and are positioned between the friction disk 1255 and each respective plate 1253*a* and 1253*b*. As the roll of food service material 1278 rotates, the friction disk 1255 also rotates and creates a drag force by its interaction with the friction pads 1254*a* and 1254*b*. In some embodiments, a spring 1256 may (such as in conjunction with the fasteners 1252) bias the plates 1253*a*, 1253*b* toward each other to sandwich the friction disk 1255 and help create a drag force (using the friction pads) as the friction disk 1255 rotates.

Further, in some embodiments, a stationary guide bar 1295 may be positioned along the path 1011 and utilized in conjunction with the drag force created to cause a de-curling effect on the food service material prior to dispensing. As shown in FIGS. 12A-C, the stationary guide bar 1295 may be connected to the dispenser housing, such as using a connection plate 1296. The food service material may be driven from the roll 1278 and over the stationary guide bar 1295 (e.g., at 1264) to cause the de-curl effect.

In some embodiments, the positioning of the stationary guide bar 1295 with respect to the position of the roll of food service material 1278 and the direction of travel along the path 1011 for dispensing is important for forming the de-curl effect. For example, in the depicted embodiment (from the illustrated perspective), while the food service material item ultimately moves to the left (e.g., toward the cutting arrangement 1045), the stationary guide bar 1295 is positioned to the right of roll of food service material item 1278. Since the food service material comes off the top of the roll 1278, the food service material has a pre-formed curl (e.g. by virtue of being rolled up) to the right. However, by forcing the food service material to take a sharp left turn over the stationary guide bar 1295 and move back to the left, the pre-formed right curl is counter-acted with a left curl (e.g., similar to rubbing a curled piece of paper on the edge of a desk).

Returning to the remainder of the dispensing path, next the food service material passes along the path 1011 through a cutting arrangement 1045. With reference to FIG. 11D, the depicted cutting arrangement 1045 includes two cutting rollers aligned on opposite sides of the path 1011. A controller, such as through a motor, may be configured to control rotation and/or engagement of one or both of the cutting rollers with the food service material to cause cutting thereof. The depicted cutting arrangement 1045 includes a first cutting roller 1021 that includes a cutter (e.g., knife) 1022 that extends outwardly from a circumferential surface of the first cutting roller 1021. The cutting arrangement 1045 also includes a second cutting roller 1023 that includes a slot 1024 that is sized to receive the cutter 1022 of the first cutting roller 1021 when the first cutting roller 1021 is rotated to cause the cutter 1022 to extend into the path 1011 and cut the food service material—thereby forming the sheet of food service material 1078*a*.

Next, the food service material moves past the print device 1075 (e.g., along arrow $P_P$ shown in FIG. 11G) where information is printed thereon. Depending on the configuration of the dispenser 1070, the printing may occur before or after cutting of the food service material. In either case, in some embodiments, the dispenser 1070 includes one or more printer rollers that are configured to maintain appropriate tension in the food service material for printing.

FIGS. 11B and 11G depict a chute 1071 that enables dispensing of the printed sheet of food service material to a food service provider. In this regard, the sheet of food service material is printed with the print device 1075 and cut with the cutting arrangement 1045. Thereafter, the printed sheet of food service material passes (e.g., under the influence of gravity) down the chute 1071 along the arrow Pc and into the dispensing slot 1072 along arrow PD.

Though not shown, the dispenser 1070 may include a wireless or wired communication element (e.g., the communication interface 76 shown and described with respect to FIG. 7), such as for use with various embodiments of the present invention described herein (e.g., with/in an on-demand food service printing system).

FIG. 13 illustrates an example cup dispenser 1170 in accordance with various example embodiments described herein (such as the dispenser 70 shown in FIG. 7C). The depicted cup dispenser 1170 includes a housing 1174 that is sized with a small footprint such as to fit on a counter and/or within a food service preparation area. The depicted cup dispenser 1170 includes a cup source 1142 that holds a stack of cups 1178. Additionally, the cup dispenser 1170 includes a user interface in the form of a screen 1179*a* and buttons 1179*b*. The screen 1179*a* can be used to display information to the food service provider. For example, the user interface 1179*a* may display the cup order that is being prepared by the dispenser. Additionally, the user interface 1179*a* may provide maintenance information to a nearby food service provider, such as if the ink needs replacement, if the stack of cups is nearly depleted, error messages, etc. In some embodiments, such information may (additionally or alternatively) be provided through wireless or wired communications with a remote computing device. The dispenser 1170 also includes a dispensing slot 1172 that enables a food service provider to collect a printed cup 1105 therefrom.

With reference to FIG. 13A, upon receiving a food service order, such as from a remote food service request module (e.g., the point of sale computing device 1103 shown in FIG. 13C) through a wireless connection W, the cup dispenser 1170 may provide an alert A to indicate that it has received the order and is beginning preparation of the printed cup. One or more cup-moving elements (not shown) may cause a single cup to drop down along a path into the dispenser (e.g., along arrow P). In the depicted embodiment, a cup is separated from the stack of cups 1178 and drops down from the cup source 1142 into the dispensing slot 1172. In some embodiments, the force of gravity may assist with movement of the cup.

With reference to FIG. 13B, a print device (not shown) may print order information and/or personalization information on the cup 1105. After printing, a cup-rotation element may cause the printed cup to rotate, such as for presentation to a food service provider. In some embodiments, a door may be used to cover the cup, such as during printing. Such an example door may be unlocked and/or automatically opened after printing is complete to enable retrieval of the printed cup by the food service provider.

FIG. 13C illustrates dispensing of a printed cup 1105 using the cup dispenser 1170. In the illustrated example, a food service provider 1108 may be alerted (e.g., the "Ding") to completion of the printed cup (although other types of alerts are contemplated, such as visual, text message, voice, etc.).

FIG. 13D illustrates an example printed cup 1105 that includes personalization information 1106 (e.g., the customer's name "Michelle") and order information 1109 (e.g., "Mint Mocha" and corresponding special instructions, such as "No Chocolate"). Once the food service provider 1108 has retrieved the printed cup, they can use the order information printed directly on the cup to help in preparation of the appropriate food service order (e.g., illustrated in FIG. 13E). Thereafter, the completed food order and corresponding printed cup 1105 can be placed out for gathering by the customer 1119. In this regard, the printed order information and/or personalization information enable easy identification of the appropriate food service order by the customer.

Example Control System for Other System(s)

The control architecture 15, such as through the controller module 60, may be configured to communicate with one or more other systems 90 (e.g., front of house (FOH) or back-of-house (BOH) system(s)). In some embodiments, the controller module 60 may be configured to determine, based on at least one of the order information or the personalization information, one or more instructions to transmit to one or more other components/systems. For example, FIG. 14 shows an example control system 810 that includes the controller module 860, a napkin dispenser 891, a cutlery dispenser 892, other system(s) 893, and an external network 812.

The controller module 860 may be configured to determine one or more instructions/messages to provide to various other systems (e.g., a napkin dispenser, cutlery dispenser, paper towel dispenser, soap dispenser, etc.). In some embodiments, some such dispensers (e.g., napkin dispenser(s), cutlery dispenser(s), paper towel dispenser(s), soap dispenser(s), etc.) may be referred to as back-of-house (BOH) systems. Such communication may occur directly to the other system(s) and/or through an external network 812.

In some embodiments, the determined instructions or messages may be based on any information gathered herein. For example, the controller module 60 may determine that the napkin dispenser 891 should dispense a certain number of napkins to fulfill a food order request and instruct the napkin dispenser 891 accordingly. Such determination of the number of napkins may be made at the napkin dispenser and/or by the controller module 60. In this regard, the determined number of napkins could be based on a personal preference, other personalization information for the customer, and/or the order information.

Similarly, the controller module 60 may determine that the cutlery dispenser 892 should dispense a certain number and/or type of cutlery items to fulfill a food order request and instruct the cutlery dispenser 892 accordingly. Such determinations may be made at the cutlery dispenser and/or by the controller module 60. In this regard, the determined number and/or type of cutlery could be based on a personal preference, other personalization information for the customer, and/or the order information.

In some embodiments, the on-demand printing system may utilize napkins or cutlery for printing information thereon—e.g., as the food service material item. In such embodiments, the printer may be configured to print on such items and may be built into the corresponding dispenser.

In some embodiments, the controller module 60 may be configured to gather information and provide the gathered information to a remote server and/or the control architecture 15 for use with data aggregation/analysis, reports, and/or other data analytics. Such information may include data gathered from various other systems as well as any other connected system.

Example Flowchart(s)

Embodiments of the present invention provide methods, apparatuses and computer program products for providing on-demand food service material printing for a food order according to various embodiments described herein. Various examples of the operations performed in accordance with embodiments of the present invention will now be provided with reference to FIG. 15.

FIG. 15 illustrates a flowchart according to an example method for providing on-demand food service material printing for a food order according to an example embodiment. The operations illustrated in and described with respect to FIG. 15 may, for example, be performed by, with the assistance of, and/or under the control of one or more of the components, architectures, modules, networks, and/or systems/devices of system 10, such as described herein.

The method 900 may include receiving a request for food service at operation 902. At operation 904, the method may include determining order information based on the request. At operation 906, the method may include determining personalization information based on the request. Then, the method may include determining order print information, such as based on the order information, at operation 908 and personalization print information, such as based on the personalization information, at operation 910. At operation 912, the method may include determining the food service material item to print on for fulfilling the food order. Then, at operation 914, the method may include printing on the food service material item and presenting it to the food service person for use with preparation of the food order.

FIG. 15 illustrates an example flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the control architecture 15. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A food service material dispenser for dispensing a sheet of food service material, the food service material dispenser comprising:

- a roll holder configured to hold a roll of food service material;
- one or more rollers;
- a motor configured to operate at least one of the one or more rollers or the roll holder to translate a leading edge of the roll of food service material along a path within the dispenser;
- a cutting arrangement positioned along the path downstream of the roll holder and configured to perform a cut of the food service material to form the sheet of food service material, wherein the sheet of food service material defines a size associated with a food service order;
- a printer positioned along the path downstream of the roll holder and configured to print at least one of order information or personalization information on the food service material, wherein the at least one of order information or personalization information is based on the food service order associated with the dispensed sheet of food service material; and a chute positioned along the path downstream of both the printer and the cutting arrangement and configured to dispense the sheet of food service material, wherein the dispensed sheet of food service material includes the at least one of order information or personalization information printed thereon.

2. The dispenser of claim 1, wherein the dispenser comprises a housing that holds the roll holder, the cutting arrangement, and the printer.

3. The dispenser of claim 1, wherein the printer is positioned along the path downstream of the cutting arrangement.

4. The dispenser of claim 3, wherein the printer includes one or more tensioning rollers that are configured to maintain tension in the cut sheet of food service material while printing occurs.

5. The dispenser of claim 1, wherein the chute defines a dispensing surface that extends downwardly such that gravity causes the sheet of food service material to dispense.

6. The dispenser of claim 1, wherein the roll of food service material defines food wrap.

7. The dispenser of claim 1, wherein the roll of food service material comprises pre-folded food service material.

8. The dispenser of claim 7 further comprising an unfolding station positioned along the path and configured to unfold at least a portion of the food service material.

9. The dispenser of claim 1 further comprising an adhesive application unit positioned along the path and configured to apply adhesive to at least a portion of the food service material.

10. The dispenser of claim 1 further comprising a folding mechanism positioned along the path and configured to fold the sheet of food service material to form a food service material item.

11. The dispenser of claim 1, wherein the cutting arrangement comprises a first cutting roller positioned on first side of the path and a second cutting roller positioned on a second side of the path, wherein the first cutting roller comprises a cutter configured to cut the food service material, wherein the second cutting roller comprises a slot, and wherein the second cutting roller is aligned with the first cutting roller relative to the path such that the cutter of the first roller fits within the slot of the second cutting roller during cutting of the food service material.

12. The dispenser of claim 11 further comprising a controller configured to control operation of the cutting arrangement to cause the cutter of the first cutting roller to cut the food service material in order to form the sheet of food service material.

13. The dispenser of claim 1 further comprising an auto-tensioner configured to maintain a desired tension level of the food service material as it travels along the path.

14. The dispenser of claim 1 further comprising:

a clutch mechanism configured to provide a drag force during movement of the food service material along the path; and a stationary guide bar positioned along the path and configured to provide a reverse curl to the food service material as the food service material passes over the stationary guide bar.

15. The dispenser of claim 1 further comprising a controller configured to initiate operation of the motor to enable automatic loading of a leading edge of a new roll of food service material at least partially along the path once the new roll of food service material is loaded into the roll holder.

16. The dispenser of claim 1 further comprising a communication element configured to communicate with a remote computing device, wherein the remote computing device comprises a food request module configured to receive a request for food service for a customer, wherein the request for food service includes the food service order.

17. The dispenser of claim 16 further comprising a controller configured to:

receive, via the communication element and from the remote computing device, food service order data corresponding to the food service order;

determine, based on the food service order data, the at least one of order information or personalization information to print on the food service material item; and cause dispensing of the sheet of food service material with the at least one of order information or personalization information printed thereon.

18. A system for causing dispensing of a sheet of food service material for use in creating a food service order, the system comprising:

a food request module stored on a remote computing device, wherein the remote computing device comprises a food request module configured to receive a request for food service for a customer, wherein the request for food service includes the food service order; and a food service material dispenser for dispensing the sheet of food service material, the food service material dispenser comprising:

a communication element configured to communicate with the remote computing device;

a roll holder configured to hold a roll of food service material;

one or more rollers;

a motor configured to operate at least one of the one or more rollers or the roll holder to translate a leading edge of the roll of food service material along a path within the dispenser;

a cutting arrangement positioned along the path downstream of the roll holder and configured to perform a cut of the food service material to form the sheet of food service material, wherein the sheet of food service material defines a size associated with the food service order;

a printer positioned along the path downstream of the roll holder and configured to print at least one of order information or personalization information on the food service material, wherein the at least one of order information or personalization information is based on the food service order associated with the dispensed sheet of food service material; and a chute positioned along the path downstream of both the printer and the cutting arrangement and configured to dispense the sheet of food service material, wherein the dispensed sheet of food service material includes the at least one of order information or personalization information printed thereon.

19. The system of claim 18, wherein the food service material dispenser further comprises a controller configured to:

receive, via the communication element and from the remote computing device, food service order data corresponding to the food service order;

determine, based on the food service order data, the at least one of order information or personalization information to print on the sheet of food service material; and cause dispensing of the sheet of food service material with the at least one of order information or personalization information printed thereon.

20. A method of dispensing a sheet of food service material, the method comprising:

providing a food service material dispenser for dispensing the sheet of food service material, the food service material dispenser comprising:

a controller;

a communication element;

a roll holder configured to hold a roll of food service material;

one or more rollers;

a motor configured to operate at least one of the one or more rollers or the roll holder to translate a leading edge of the roll of food service material along a path within the dispenser;

a cutting arrangement positioned along the path downstream of the roll holder and configured to perform a cut of the food service material to form the sheet of food service material, wherein the sheet of food service material defines a size associated with a food service order;

a printer positioned along the path downstream of the roll holder and configured to print at least one of order information or personalization information on the food service material, wherein the at least one of order information or personalization information is based on the food service order associated with the dispensed sheet of food service material; and a chute positioned along the path downstream of both the printer and the cutting arrangement and configured to dispense the sheet of food service material, wherein the dispensed sheet of food service material includes the at least one of order information or personalization information printed thereon; and receiving, via the communication element and from a remote computing device, food service order data corresponding to the food service order;

determining, via the controller and based on the food service order data, the at least one of order information or personalization information to print on the sheet of food service material; and causing, via the food service material dispenser, dispensing of the sheet of food service material with the at least one of order information or personalization information printed thereon.

* * * * *